United States Patent
Hayashi

(10) Patent No.: US 7,944,490 B2
(45) Date of Patent: May 17, 2011

(54) IMAGE PICKUP APPARATUS AND METHOD AND APPARATUS FOR MANUFACTURING THE SAME

(75) Inventor: Yusuke Hayashi, Tokyo (JP)

(73) Assignee: Kyocera Corporation, Kyoto (JP)

( * ) Notice: Subject to any disclaimer, the term of this patent is extended or adjusted under 35 U.S.C. 154(b) by 990 days.

(21) Appl. No.: 11/755,630

(22) Filed: May 30, 2007

(65) Prior Publication Data

US 2008/0043126 A1    Feb. 21, 2008

(30) Foreign Application Priority Data

May 30, 2006   (JP) .................. 2006-150712

(51) Int. Cl.
- *H04N 3/14* (2006.01)
- *G03B 17/00* (2006.01)
- *G03B 3/00* (2006.01)
- *G02B 5/18* (2006.01)

(52) U.S. Cl. ........... 348/294; 396/79; 396/125; 359/558
(58) Field of Classification Search .................. 348/294; 358/474; 359/558; 396/79, 125
See application file for complete search history.

(56) References Cited

U.S. PATENT DOCUMENTS

| | | | |
|---|---|---|---|
| 3,739,089 A | 6/1973 | Latall | |
| 5,664,243 A * | 9/1997 | Okada et al. | 396/246 |
| 5,748,371 A | 5/1998 | Cathey, Jr. et al. | |
| 6,021,005 A | 2/2000 | Cathey, Jr. et al. | |
| 6,069,738 A | 5/2000 | Cathey, Jr. et al. | |
| 6,148,528 A | 11/2000 | Jackson | |
| 6,233,060 B1 | 5/2001 | Shu et al. | |
| 6,241,656 B1 | 6/2001 | Suga | |
| 6,449,087 B2 | 9/2002 | Ogino | |
| 6,525,302 B2 * | 2/2003 | Dowski et al. | 250/201.2 |
| 6,606,669 B1 | 8/2003 | Nakagiri | |
| 6,642,504 B2 | 11/2003 | Cathey, Jr. | |
| 6,984,206 B2 * | 1/2006 | Kumei et al. | 600/176 |
| 7,158,660 B2 * | 1/2007 | Gee et al. | 382/128 |

(Continued)

FOREIGN PATENT DOCUMENTS

JP   63-229851 A   9/1988

(Continued)

OTHER PUBLICATIONS

Dowski, Edward R. Jr., "Wavefront coding: a modern method of achieving high-performance and/or low-cost imaging systems", Current Developments in Optical Design and Optical Engineering VIII, Proc. SPIE vol. 3779, p. 137-145, Oct. 1999.

(Continued)

*Primary Examiner* — Lin Ye
*Assistant Examiner* — Mekonnen Dagnew
(74) *Attorney, Agent, or Firm* — Procopio, Cory, Hargreaves & Savitch LLP

(57) ABSTRACT

An image pickup apparatus includes an element-including optical system, a variable aperture, a detector, and a converter. The element-including optical system has an optical system and an optical wavefront modulation element which modulates an optical transfer function. The detector picks up an object image that passes through the optical system, the variable aperture, and the optical wavefront modulation element. The converter generates an image signal with a smaller blur than that of a signal of a blurred object image output from the detector. Positions at which the element-including optical system and the detector are attached are adjusted by stopping down a variable aperture included in the element-including optical system.

23 Claims, 25 Drawing Sheets

U.S. PATENT DOCUMENTS

| | | |
|---|---|---|
| 7,400,393 B2 | 7/2008 | Shibata et al. |
| 7,583,301 B2 | 9/2009 | Sakurai et al. |
| 7,630,584 B2 | 12/2009 | Nose et al. |
| 2002/0118457 A1 | 8/2002 | Dowski, Jr. |
| 2003/0076514 A1 | 4/2003 | Gallagher et al. |
| 2003/0122926 A1 | 7/2003 | Kumei et al. |
| 2003/0158503 A1* | 8/2003 | Matsumoto ............ 600/593 |
| 2004/0136605 A1 | 7/2004 | Seger et al. |
| 2004/0190762 A1* | 9/2004 | Dowski et al. .......... 382/128 |
| 2005/0128342 A1 | 6/2005 | Izukawa |
| 2006/0012385 A1 | 1/2006 | Tsao et al. |
| 2007/0086674 A1 | 4/2007 | Guan |
| 2007/0268376 A1 | 11/2007 | Yoshikawa et al. |
| 2007/0291152 A1 | 12/2007 | Suekane et al. |
| 2008/0007797 A1 | 1/2008 | Hayashi |
| 2008/0043126 A1 | 2/2008 | Hayashi |
| 2008/0074507 A1 | 3/2008 | Ohara et al. |
| 2008/0081996 A1 | 4/2008 | Grenon et al. |
| 2008/0259275 A1 | 10/2008 | Aoki et al. |
| 2008/0278592 A1 | 11/2008 | Kuno et al. |

FOREIGN PATENT DOCUMENTS

| | | | |
|---|---|---|---|
| JP | 03-010380 A | 1/1991 |
| JP | 03-175403 A | 7/1991 |
| JP | 06-130267 A | 5/1994 |
| JP | 08-128923 A | 5/1996 |
| JP | 10-145667 A | 5/1998 |
| JP | 11-261868 A | 9/1999 |
| JP | 2000-050146 A | 2/2000 |
| JP | 2000-098301 A | 7/2000 |
| JP | 2000-266979 A | 9/2000 |
| JP | 2000-275582 A | 10/2000 |
| JP | 2001-257930 A | 9/2001 |
| JP | 2001-346069 A | 12/2001 |
| JP | 2002-027047 A | 1/2002 |
| JP | 2002-127852 A | 5/2002 |
| JP | 2002-221657 A | 9/2002 |
| JP | 2003-185905 A | 7/2003 |
| JP | 2003-235794 | 8/2003 |
| JP | 2003-244530 A | 8/2003 |
| JP | 2003-248171 A | 9/2003 |
| JP | 2003-262778 A | 9/2003 |
| JP | 2003-283878 A | 10/2003 |
| JP | 2008-017157 A | 1/2004 |
| JP | 2004-037733 A | 2/2004 |
| JP | 2004-147188 A | 5/2004 |
| JP | 2004-153497 | 5/2004 |
| JP | 2004-264577 A | 9/2004 |
| JP | 2004-328506 A | 11/2004 |
| JP | 2005-326684 A | 11/2005 |
| JP | 2006-139246 A | 1/2006 |
| JP | 2006-049949 A | 2/2006 |
| JP | 2006-094112 A | 4/2006 |
| JP | 2006-154767 A | 11/2006 |
| JP | 2006-308987 A | 11/2006 |
| JP | 2007-060647 A | 3/2007 |
| JP | 2007-300208 A | 11/2007 |
| JP | 2008-035282 A | 2/2008 |
| WO | 2006/022373 A | 3/2006 |
| WO | 2007/013621 A1 | 2/2007 |
| WO | 2007/074649 A1 | 7/2007 |

OTHER PUBLICATIONS

Dowski, Edward R. Jr., "Wavefront Coding: jointly optimized optical and digital imaging systems" Ed. Proc. SPIE Visual Information Processing IX, vol. 4041, pp. 114-120, Apr. 25, 2000.

Office Action dated Jun. 10, 2010 issued for U.S. Appl. No. 11/861,217.

Office Action dated Mar. 10, 2010 issued for U.S. Appl. No. 11/773,792.

Final Office Action dated Aug. 18, 2010 issued for U.S. Appl. No. 11/773,792.

Dowski, Edward R. Jr., et al., "Extended Depth of Field through Wave-Front Coding", Appl. Opt. vol. 34, p. 1859-1866 (1995).

International Search Report dated May 12, 2009 issued by the Japanese Patent Office for International Application No. PCT/JP2009/056376.

Office Action dated Jan. 19, 2011 issued by the Japanese Patent Office for the corresponding Japanese Application No. JP 2006-259646.

* cited by examiner

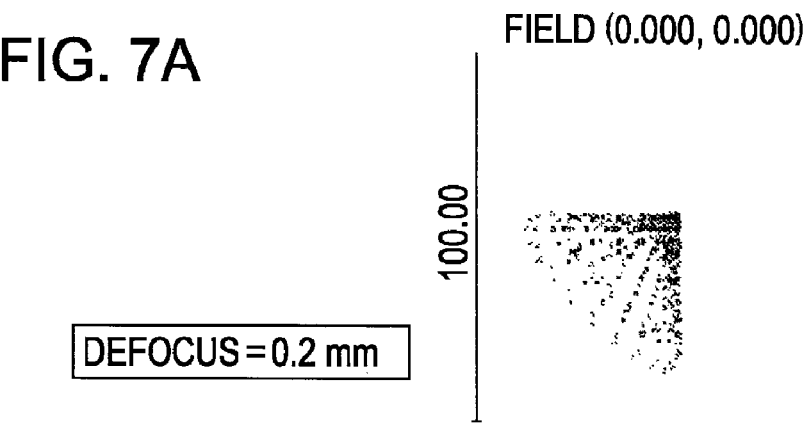
FIG. 7A — DEFOCUS = 0.2 mm
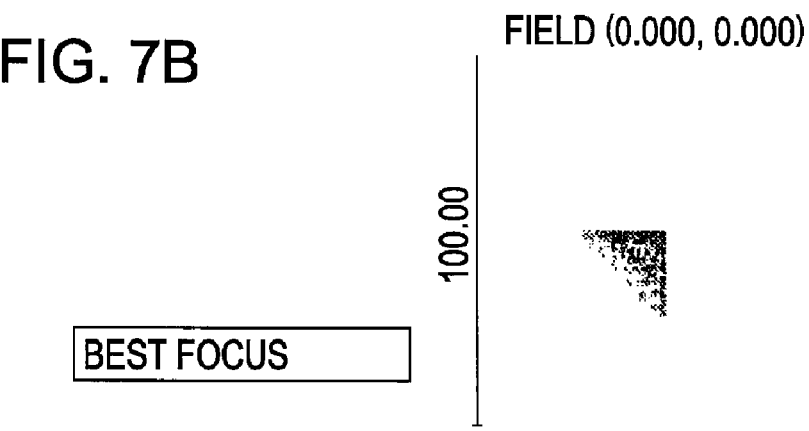
FIG. 7B — BEST FOCUS
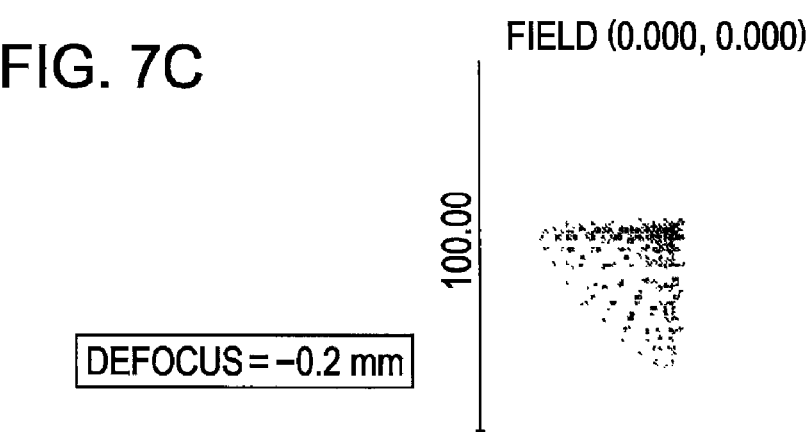
FIG. 7C — DEFOCUS = −0.2 mm

FIELD (0.000, 0.000)

FIG. 21

EXAMPLE OF KERNEL DATA STORAGE ROM

| OPTICAL MAGNIFICATION | ×1.5 | ×5 | ×10 |
|---|---|---|---|
| KERNEL DATA | A | B | C |

$$A = \begin{pmatrix} a & b \\ c & d \end{pmatrix}$$

$$B = \begin{pmatrix} a' & b' & c' \\ d' & e' & f' \\ g' & h' & i' \end{pmatrix}$$

$$C = \begin{pmatrix} a' & b' & c' & d' \\ e' & f' & g' & h' \\ i' & j' & k' & l' \\ m' & n' & o' & p' \end{pmatrix}$$

FIG. 22

EXAMPLE OF KERNEL TABLE

| APERTURE STOP | F2.8 | F4 |
|---|---|---|
| KERNEL DATA | A | B |

$$A = \begin{pmatrix} a & b \\ c & d \end{pmatrix}$$

$$B = \begin{pmatrix} a' & b' & c' \\ d' & e' & f' \\ g' & h' & i' \end{pmatrix}$$

EXAMPLE OF KERNEL TABLE

| OBJECT DISTANCE INFORMATION | 100 mm | 500 mm | 4 m |
|---|---|---|---|
| KERNEL DATA | A | B | C |

$$A = \begin{pmatrix} a & b \\ c & d \end{pmatrix}$$

$$B = \begin{pmatrix} a' & b' & c' \\ d' & e' & f' \\ g' & h' & i' \end{pmatrix}$$

$$C = \begin{pmatrix} a' & b' & c' & d' \\ e' & f' & g' & h' \\ i' & j' & k' & l' \\ m' & n' & o' & p' \end{pmatrix}$$

FIELD (0.000, 0.000)

DEFOCUS = 0.2 mm 0.4000 (mm)
CANTER OF GRAVITY (0.0000, 0.0000)

FIELD (0.000, 0.000)

BEST FOCUS 0.4000 (mm)
CANTER OF GRAVITY (0.0000, 0.0000)

FIELD (0.000, 0.000)

DEFOCUS = −0.2 mm 0.4000 (mm)
CANTER OF GRAVITY (0.0000, 0.0000)

IMAGE PICKUP APPARATUS AND METHOD AND APPARATUS FOR MANUFACTURING THE SAME

CROSS-REFERENCE TO RELATED APPLICATIONS

The present application claims priority under 35 U.S.C. §119 to Japanese Patent Application No. 2006-150712, filed May 30, 2006, which is incorporated herein by reference in its entirety.

BACKGROUND OF THE INVENTION

1. Field of the Invention

The present invention relates to an image pickup apparatus for use in a digital still camera, a mobile phone camera, a Personal Digital Assistant (PDA) camera, an image inspection apparatus, an industrial camera used for automatic control, etc., which includes a detector (what is called image pickup device, such as CCD and CMOS) and an optical system. The present invention also relates to a method and an apparatus for manufacturing the image pickup apparatus.

2. Description of the Related Art

Recently, as in digital cameras, solid-state detectors, such as Charge Coupled Devices (CCD) and Complementary Metal Oxide Semiconductor (CMOS) sensors, have been provided on imaging planes instead of films.

In image pickup apparatuses including CCDs or CMOS sensors, an image of an object is optically taken by an optical system and is extracted by a detector in the form of an electric signal. Such an apparatus is used in, for example, a digital still camera, a video camera, a digital video unit, a personal computer, a mobile phone, a PDA, an image inspection apparatus, an industrial camera used for automatic control, etc.

FIG. 32 is a schematic diagram illustrating the structure of a known image pickup apparatus and the state of ray bundles. Referring to FIG. 32, an image pickup apparatus 1 includes an optical system 2 and a detector 3, such as a CCD and a CMOS sensor. The optical system 2 includes object-side lenses 21 and 22, an aperture stop 23, and an imaging lens 24 arranged in that order from an object side (OBJS) toward the detector 3. In the image pickup apparatus 1, the best-focus plane coincides with the plane on which the detector 3 is disposed. FIGS. 33A to 33C show spot images formed on a light-receiving surface of the detector 3 included in the image pickup apparatus 1.

In such an image pickup apparatus, in order to achieve a large depth of field, a method has been suggested in which light is regularly blurred by a phase plate and is reconstructed by digital processing. On the other hand, an automatic exposure control system for a digital camera in which filtering process using a transfer function is performed has also been suggested.

In known image pickup apparatuses, it is premised that a Point Spread Function (PSF) obtained when the above-described phase plate is placed in an optical system is constant. If the PSF varies, it becomes difficult to obtain an image with a large depth of field by convolution using a kernel.

In particular, in lens systems like zoom systems and auto-focus (AF) systems, there is a large problem in adopting the above-mentioned structure because high precision is required in the optical design and costs are increased accordingly. More specifically, in known image pickup apparatuses, a suitable convolution operation cannot be performed and the optical system must be designed so as to eliminate aberrations, such as astigmatism, coma aberration, and zoom chromatic aberration that cause a displacement of a spot image at wide angle and telephoto positions. However, to eliminate the aberrations, the complexity of the optical design is increased and the number of design steps, costs, and the lens size are increased.

In addition, when the aperture is stopped down to shoot a bright object, the phase modulation element is covered by the aperture stop and the phase variation is reduced. This affects the reconstructed image when the image reconstruction process is performed.

According to the above-described method, an optical image obtained before the image reconstruction process is always blurred irrespective of an object distance. Therefore, it is difficult to adjust the positions at which the optical system and the detector are attached. In order to increase the depth of field, it is necessary to attach the optical system and the detector at suitable positions.

SUMMARY OF THE INVENTION

According to one aspect of the present invention, the image pickup apparatus includes an element-including optical system, a variable aperture, a detector, and a converter. The element-including optical system has an optical system and an optical wavefront modulation element which modulates an optical transfer function. The detector picks up an object image that passes through the optical system, the variable aperture, and the optical wavefront modulation element. The converter generates an image signal with a smaller blur than that of a signal of a blurred object image output from the detector. Positions at which the element-including optical system and the detector are attached are adjusted by stopping down a variable aperture included in the element-including optical system.

According to another aspect of the present invention, a manufacturing device for manufacturing an image pickup apparatus includes an adjusting device. The adjusting device adjusts positions at which an element-including optical system including an optical wavefront modulation element that modulates an optical transfer function and a detector are attached by stopping down a variable aperture included in the element-including optical system.

According to a further aspect of the present invention, a method for manufacturing an image pickup apparatus by adjusting positions where an element-including optical system and a detector are attached includes two steps. In the first step, the element-including optical system was formed by placing an optical wavefront modulation element that modulates an optical transfer function in an optical system. In the second step, positions where the element-including optical system and the detector are attached are adjusted by stopping down an aperture included in the element-including optical system.

BRIEF DESCRIPTION OF THE DRAWINGS

FIG. 7A illustrates a spot image formed on a light-receiving surface of a detector according to the embodiment when a focal point is displaced by 0.2 mm (Defocus=0.2 mm);

FIG. 7B illustrates a spot image formed on the light-receiving surface of the detector when the focal point is not displaced (Best focus);

FIG. 7C illustrates a spot image formed on the light-receiving surface of the detector when the focal point is displaced by −0.2 mm (Defocus=−0.2 mm);

FIG. 21 is a diagram illustrating an example of data stored in a kernel data ROM (optical magnification);

FIG. 22 is a diagram illustrating another example of data stored in a kernel data ROM (F number);

DETAILED DESCRIPTION OF THE PREFERRED EMBODIMENT

An embodiment of the present invention will be described below with reference to the accompanying drawings.

Figure 1:
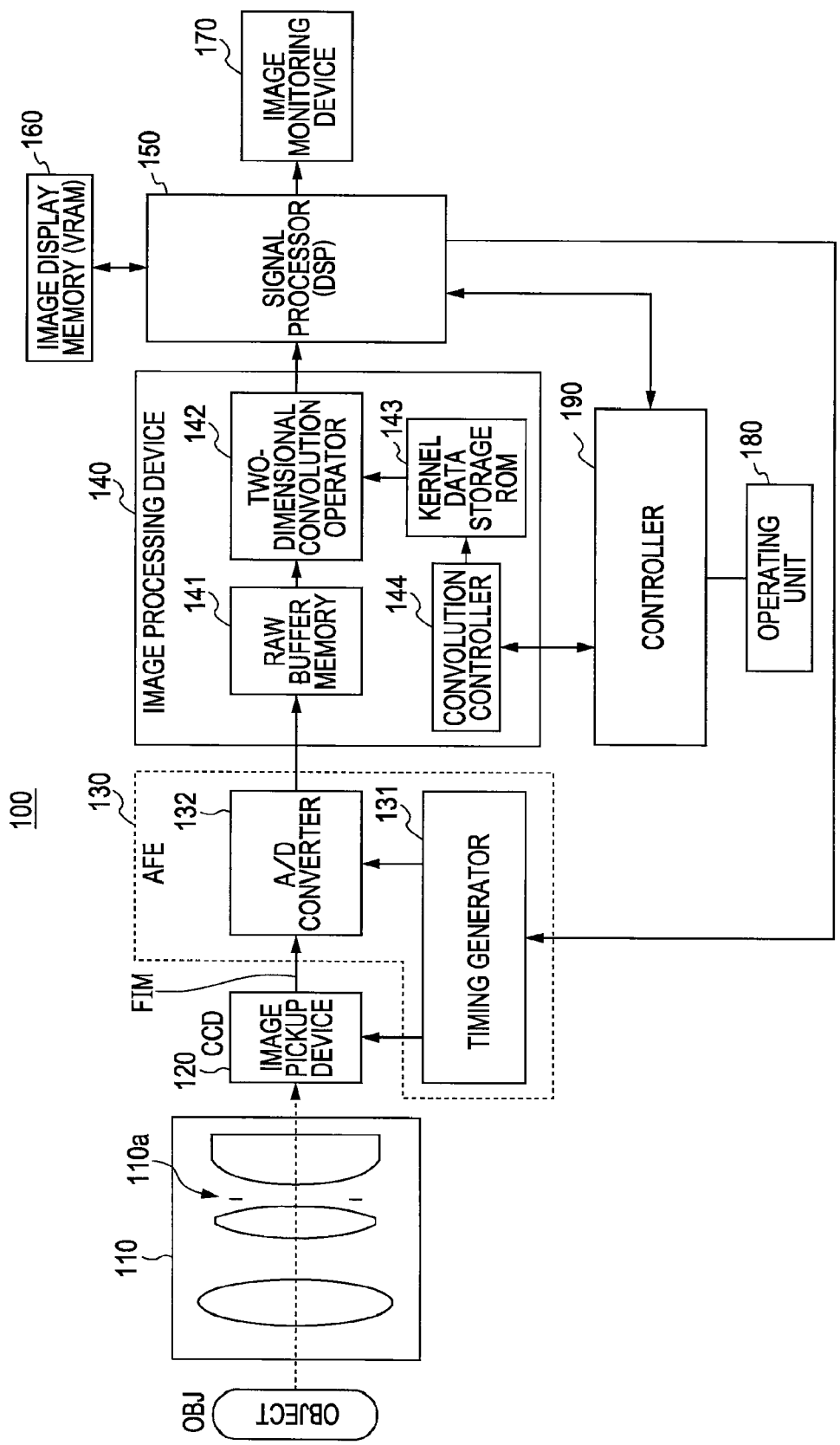
FIG. 1 is a block diagram illustrating the structure of an image pickup apparatus according to an embodiment of the present invention.

As shown in FIG. 1, an image pickup apparatus 100 according to the present embodiment includes an element-including optical system 110, a detector 120, an analog front end (AFE) unit 130, an image processing device 140, a signal processor (DSP) 150, an image display memory 160, an image monitoring device 170, an operating unit 180, and a controller 190.

The element-including optical system 110 supplies an image obtained by shooting an object OBJ to the detector 120. The element-including optical system 110 includes a variable aperture 110a.

The detector 120 includes a CCD or a CMOS sensor. The detector 120 receives an image from the element-including optical system 110 is formed and outputs first image information representing the image formed thereon. The output is sent to the image processing device 140 via the AFE unit 130 as a first image (FIM) electric signal.

In FIG. 1, a CCD is shown as an example of the detector 120.

As described below, positions where the element-including optical system 110 and the detector 120 are attached are adjusted such that a contrast detected by stopping down the aperture in the optical system including an optical wavefront modulation element for modulating an optical transfer function (OTF) becomes equal to or more than a predetermined threshold.

The AFE unit 130 includes a timing generator 131 and an analog/digital (A/D) converter 132.

The timing generator 131 generates timing for driving the CCD in the detector 120. The A/D converter 132 converts an analog signal input from the CCD into a digital signal, and outputs the thus-obtained digital signal to the image processing device 140.

The image processing device (two-dimensional convolution means) 140 receives the digital signal representing the picked-up image from the AFE unit 130, subjects the signal to a two-dimensional convolution process, and outputs the result to the signal processor 150. The signal processor 150 performs a filtering process of the optical transfer function (OTF) on the basis of the information obtained from the image processing device 140 and exposure information obtained from the controller 190. The exposure information includes aperture information. The image processing device 140 has a function of generating an image signal with a smaller blur than that of a blurred object-image signal that is obtained from the detector 120. In addition, the signal processor 150 has a function of performing noise-reduction filtering in the first step. Processes performed by the image processing device 140 will be described in detail below.

The signal processor (DSP) 150 performs processes including color interpolation, white balancing, YCbCr conversion, compression, filing, etc., stores data in the memory 160, and displays images on the image monitoring device 170.

The controller 190 performs exposure control, receives operation inputs from the operating unit 180 and the like, and determines the overall operation of the system on the basis of the received operation inputs. Thus, the controller 190 controls the AFE unit 130, the image processing device 140, the signal processor 150, the variable aperture 110*a*, etc., so as to perform arbitration control of the overall system.

The structures and functions of the element-including optical system 110 and the image processing device 140 according to the present embodiment will be described below.

Figure 2:
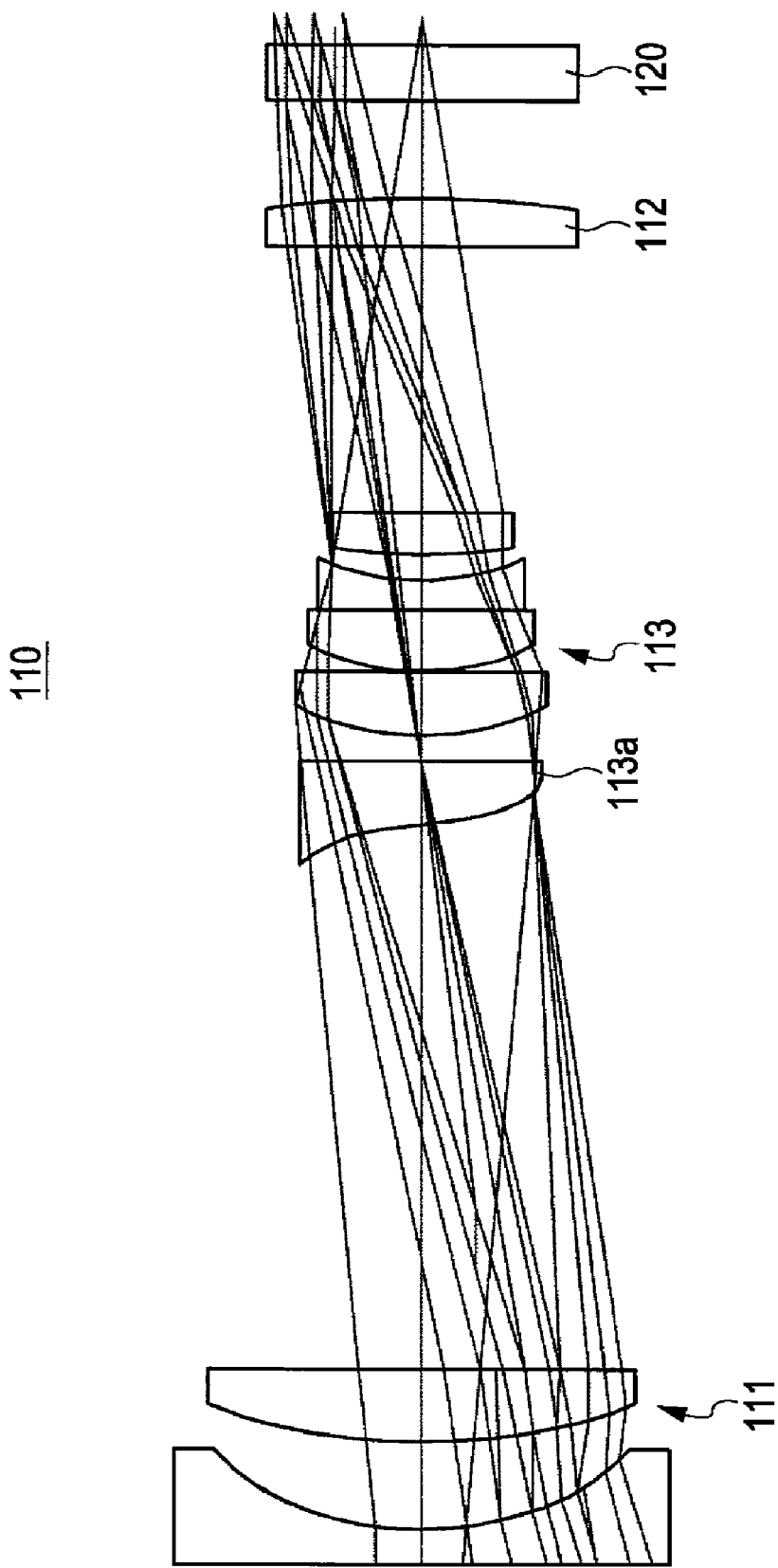
FIG. 2 is a schematic diagram illustrating the structure of an element-including optical system at a wide-angle position in an image pickup apparatus having a zoom function according to the embodiment.
Figure 3:
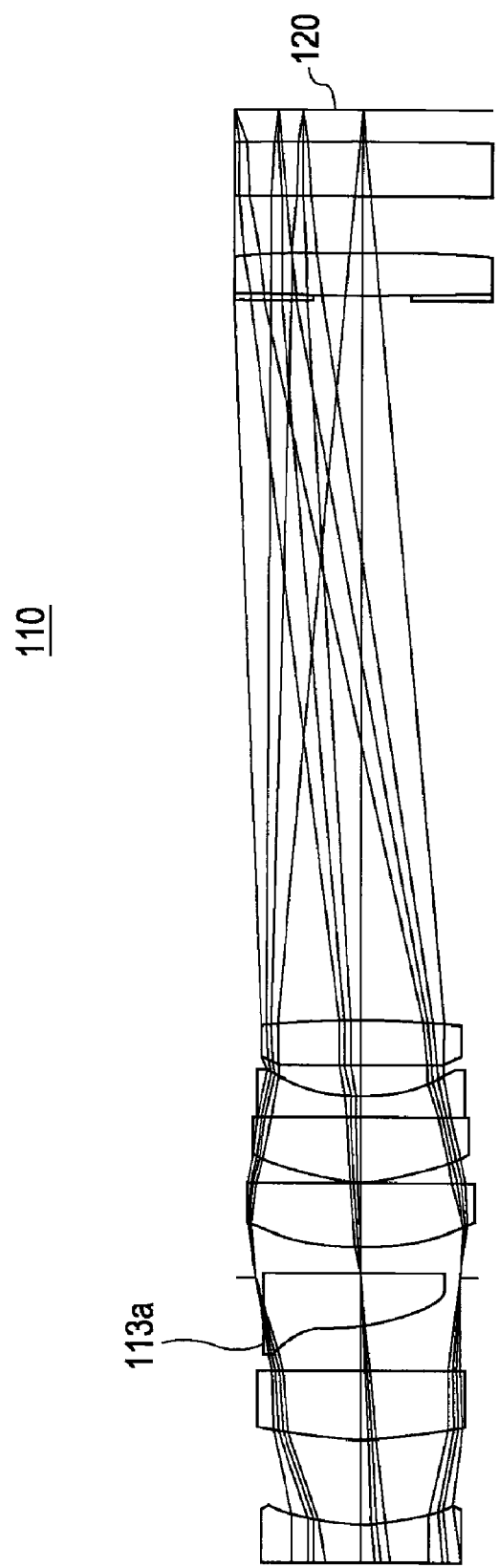
FIG. 3 is a schematic diagram illustrating the structure of the element-including optical system at a telephoto position in the image pickup apparatus having the zoom function according to the embodiment.

FIGS. 2 and 3 are schematic diagrams illustrating the element-including optical system 110 having a zoom function (hereinafter sometimes called an element-including zoom optical system) in the image pickup apparatus. FIG. 2 shows a wide-angle position and FIG. 3 shows a telephoto position.

The element-including zoom optical system 110 shown in FIGS. 2 and 3 includes an object-side lens 111, an imaging lens 112, and a movable lens group 113. The object-side lens 111 is disposed at the object side (OBJS). The imaging lens 112 is provided for forming an image on the detector 120. The movable lens group 113 is placed between the object-side lens 111 and the imaging lens 112. The movable lens group 113 includes an optical wavefront modulation element 113*a* for changing the wavefront shape of light that passes through the imaging lens 112 to form an image on a light-receiving surface of the detector 120. The optical wavefront modulation element 113*a* is, for example, a phase plate having a three-dimensional curved surface. An aperture stop (not shown) is also placed between the object-side lens 111 and the imaging lens 112.

In the present embodiment, for example, the variable aperture 110*a* is provided and the aperture size (opening) thereof is controlled by the exposure control (device).

Although a phase plate is used as the optical wavefront modulation element in the present embodiment, any type of optical wavefront modulation element may be used as long as the wavefront shape can be changed. For example, an optical element having a varying thickness (e.g., a phase plate having a three-dimensional curved surface), an optical element having a varying refractive index (e.g., a gradient index wavefront modulation lens), an optical element having a coated lens surface or the like so as to have varying thickness and refractive index (e.g., a wavefront modulation hybrid lens or a structure in which a lens surface functions as a phase plane), a liquid crystal device capable of modulating the phase distribution of light (e.g., a liquid-crystal spatial phase modulation device), etc., may be used as the optical wavefront modulation element.

According to the present embodiment, a regularly blurred image is obtained using a phase plate as the optical wavefront modulation element. However, lenses included in normal optical systems that can form a regularly blurred image similar to that obtained by the optical wavefront modulation element may also be used. In such a case, the optical wavefront modulation element can be omitted from the optical system. In this case, instead of dealing with blur caused by the phase plate as described below, blur caused by the optical system will be dealt with.

The element-including zoom optical system 110 shown in FIGS. 2 and 3 is obtained by placing the optical phase plate 113*a* in a 3× zoom system of a digital camera.

The phase plate 113*a* shown in FIGS. 2 and 3 is an optical lens by which light converged by an optical system is regularly blurred. Due to the phase plate, an image that is not in focus at any point thereof can be formed on the detector 120.

In other words, the phase plate 113*a* forms light with a large depth (which plays a major role in image formation) and flares (blurred portions).

A system for performing digital processing of the regularly blurred image so as to reconstruct a focused image is called a wavefront-aberration-control optical system or a Depth Expansion Optical System (DEOS). In the present embodiment, the function of this system is provided by the image processing device 140.

Figure 6:
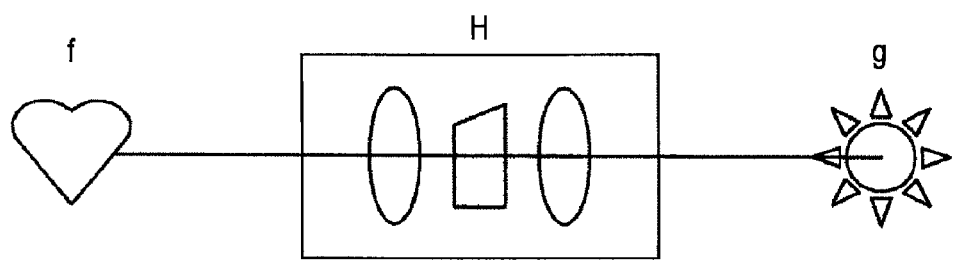
FIG. 6 is a diagram illustrating the principle of a DEOS.

The basic principle of the DEOS will be described below. As shown in FIG. 6, when an object image f is supplied to the DEOS H, an image g is generated.

This process can be expressed by the following equation:

$$g = H * f$$

where '*' indicates convolution.

In order to obtain the object from the generated image g, the following process is necessary:

$$f = H^{-1} * g$$

A kernel size and a coefficient of the H function will be described below.

ZPn, ZPn-1, . . . indicate zoom positions and Hn, Hn-1, . . . indicate the respective H functions.

Since the corresponding spot images differ from each other, the H functions can be expressed as follows:

$$Hn = \begin{pmatrix} a & b & c \\ d & e & f \end{pmatrix}$$

$$Hn-1 = \begin{pmatrix} a' & b' & c' \\ d' & e' & f' \\ g' & h' & i' \end{pmatrix}$$

The difference in the number of rows and/or columns in the above matrices is called the kernel size, and each of the numbers in the matrices is called the coefficient.

Each of the H functions may be stored in a memory. Alternatively, the PSF may be set as a function of object distance and be calculated on the basis of the object distance, so that the H function can be obtained by calculation. In such a case, a filter optimum for an arbitrary object distance can be obtained. Alternatively, the H function itself may be set as a function of object distance, and be directly determined from the object distance.

In the present embodiment, as shown in FIG. 1, the image taken by the element-including optical system 110 is picked up by the detector 120, and is input to the image processing device 140 when the aperture is open. The image processing device 140 acquires a coefficient that corresponds to the element-including optical system 110 and generates an image signal with a smaller blur than that of the blurred-image signal from the detector 120 using the acquired coefficient.

In the present embodiment, as described above, the term "blur" refers to the phenomenon in which an image that is not in focus at any point thereof is formed on the detector 120 due to the phase plate 113a placed in the optical system, and in which light with a large depth (which plays a major role in image formation) and flares (blurred portions) are formed by the phase plate 113a. Since the image is blurred and blurred portions are formed, the term "blur" has a meaning similar to that of "aberration". Therefore, in the present embodiment, blur is sometimes explained as aberration.

In the present embodiment, the DEOS is used so that a high-definition image can be obtained, the structure of the optical system can be simplified, and the costs can be reduced.

Features of the DEOS will be described in more detail below.

FIGS. 7A to 7C show spot images formed on the light-receiving surface of the detector 120.

FIG. 7A shows the spot image obtained when the focal point is displaced by 0.2 mm (Defocus=0.2 mm), FIG. 7B shows the spot image obtained when the focal point is not displaced (Best focus), and FIG. 7C shows the spot image obtained when the focal point is displaced by –0.2 mm (Defocus=–0.2 mm).

As is clear from FIGS. 7A to 7C, in the image pickup apparatus 100 according to the present embodiment, light with a large depth (which plays a major role in image formation) and flares (blurred portions) are formed by the phase plate 113a.

Thus, the first image FIM formed by the image pickup apparatus 100 according to the present embodiment is in light conditions with an extremely large depth.

Figure 8A:
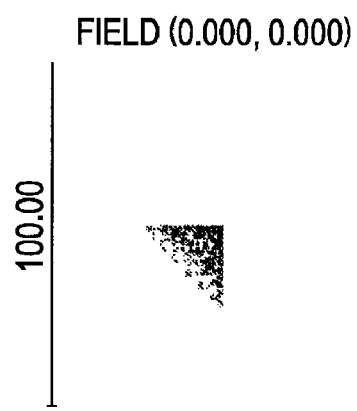
FIG. 8A is a diagram for explaining an MTF of a first image formed by the detector and illustrates a spot image formed on the light-receiving surface of the detector included in the image pickup apparatus.
Figure 8B:
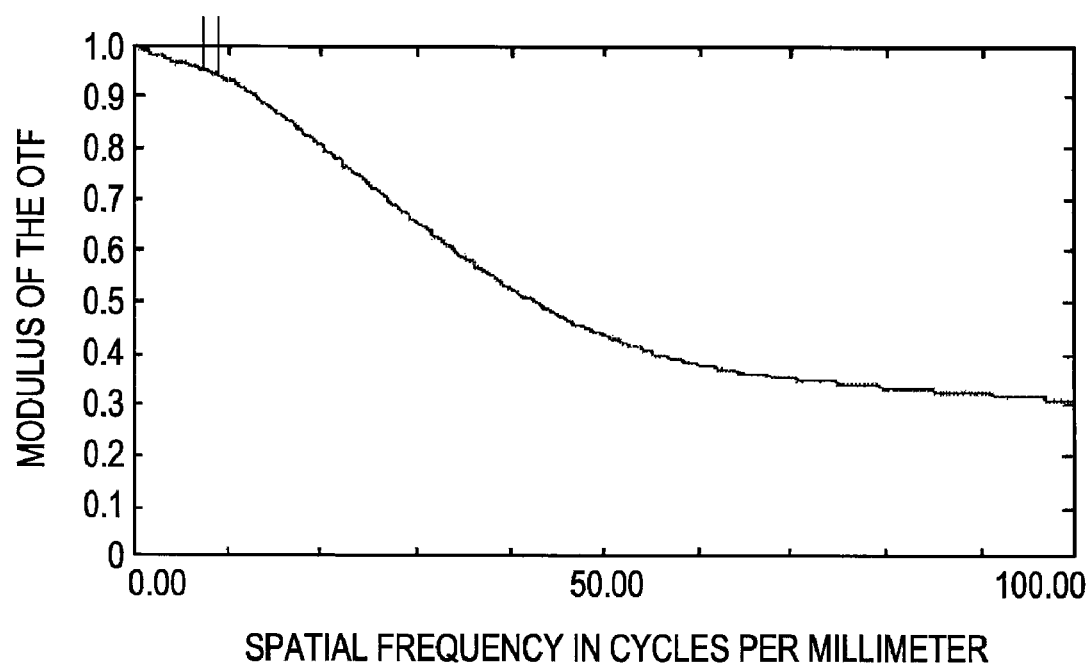
FIG. 8B is a diagram for explaining the MTF of the first image formed by the detector and illustrates the MTF characteristic with respect to spatial frequency.

FIGS. 8A and 8B are diagrams for explaining a Modulation Transfer Function (MTF) of the first image formed by the image pickup apparatus according to the present embodiment. FIG. 8A shows a spot image formed on the light-receiving surface of the detector included in the image pickup apparatus. FIG. 8B shows the MTF characteristic with respect to spatial frequency.

In the present embodiment, a final, high-definition image is obtained by a correction process performed by the image processing device 140 including, for example, a Digital Signal Processor (DSP). Therefore, as shown in FIGS. 8A and 8B, the MTF of the first image is basically low.

Figure 9:
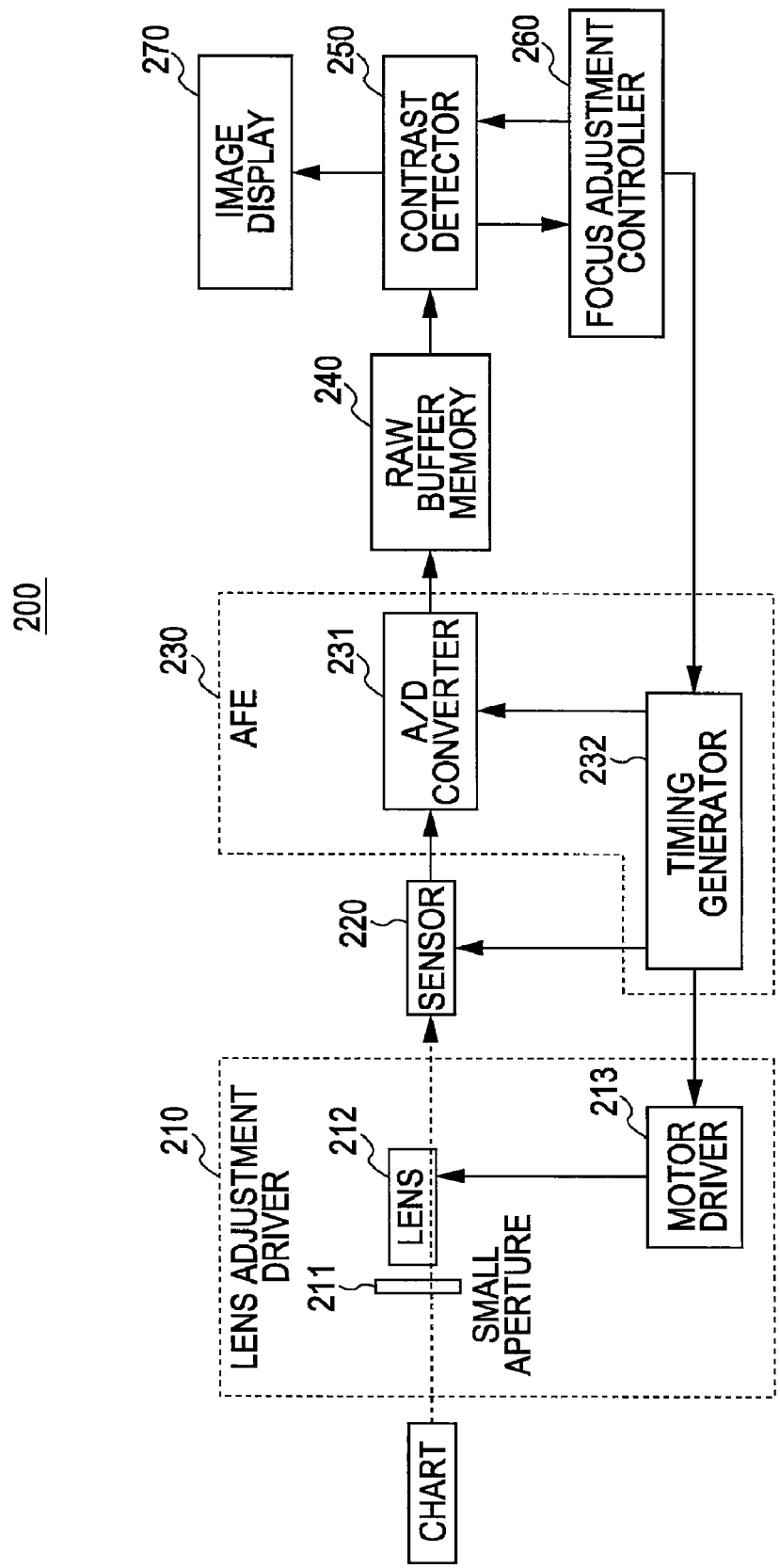
FIG. 9 a block diagram illustrating the structure of an adjusting device according to the embodiment.

In the present embodiment, positions where the element-including optical system 110 and the detector 120 are attached are adjusted by an adjusting device (manufacturing device) 200 shown in FIG. 9 such that a contrast detected after stopping down the aperture in the element-including optical system 110 including the optical wavefront modulation element for modulating the optical transfer function (OTF) becomes equal to or more than a predetermined threshold.

Thus, in the process of assembling the image pickup apparatus 100 according to the present embodiment, the positions where the element-including optical system 110 and the detector 120 are attached are adjusted by stopping down the aperture so that a normal optical image can be obtained.

As shown in FIG. 9, the adjusting device 200 includes a lens adjustment driver 210, a sensor 220 that corresponds to the detector 120 shown in FIG. 1, an analog front end (AFE) unit 230, a RAW buffer memory 240, a contrast detector 250, a focus adjustment controller 260, and an image display 270.

The lens adjustment driver 210 includes a small aperture 211 and an element-including lens system (optical system) 212 including an optical wavefront modulation element. A motor driver 213 drives the element-including lens system 212 along an optical axis thereof, thereby setting the lens position at a desired position.

The AFE unit 230 includes a timing generator 232 and an A/D converter 231.

The timing generator 232 is controlled by the focus adjustment controller 260 so as to generate timing for driving a CCD included in the sensor (detector) 220. The A/D converter 231 converts an analog signal input from the CCD into a digital signal, and outputs the thus-obtained digital signal to the RAW buffer memory 240.

In addition, the timing generator 232 is also controlled by the focus adjustment controller 260 so as to supply a drive signal for adjusting the position of the lens system 212 relative to the sensor 220 to adjust the focus to the motor driver 213.

The contrast detector 250 measures the contrast on the basis of data stored in the RAW buffer memory 240 while the lens system 212 is at a certain position.

The focus adjustment controller 260 outputs a control signal for controlling and changing the position of the lens system 212 to the timing generator 232 included in the AFE unit 230 and causes the contrast detector 250 to measure the contrast while the lens system 212 is at the controlled position. The measurement result is compared with a predetermined threshold. If the measured value is equal to or more than the threshold, the current lens position is determined as the focal position and a message indicating this is, for example, displayed.

Figure 10:
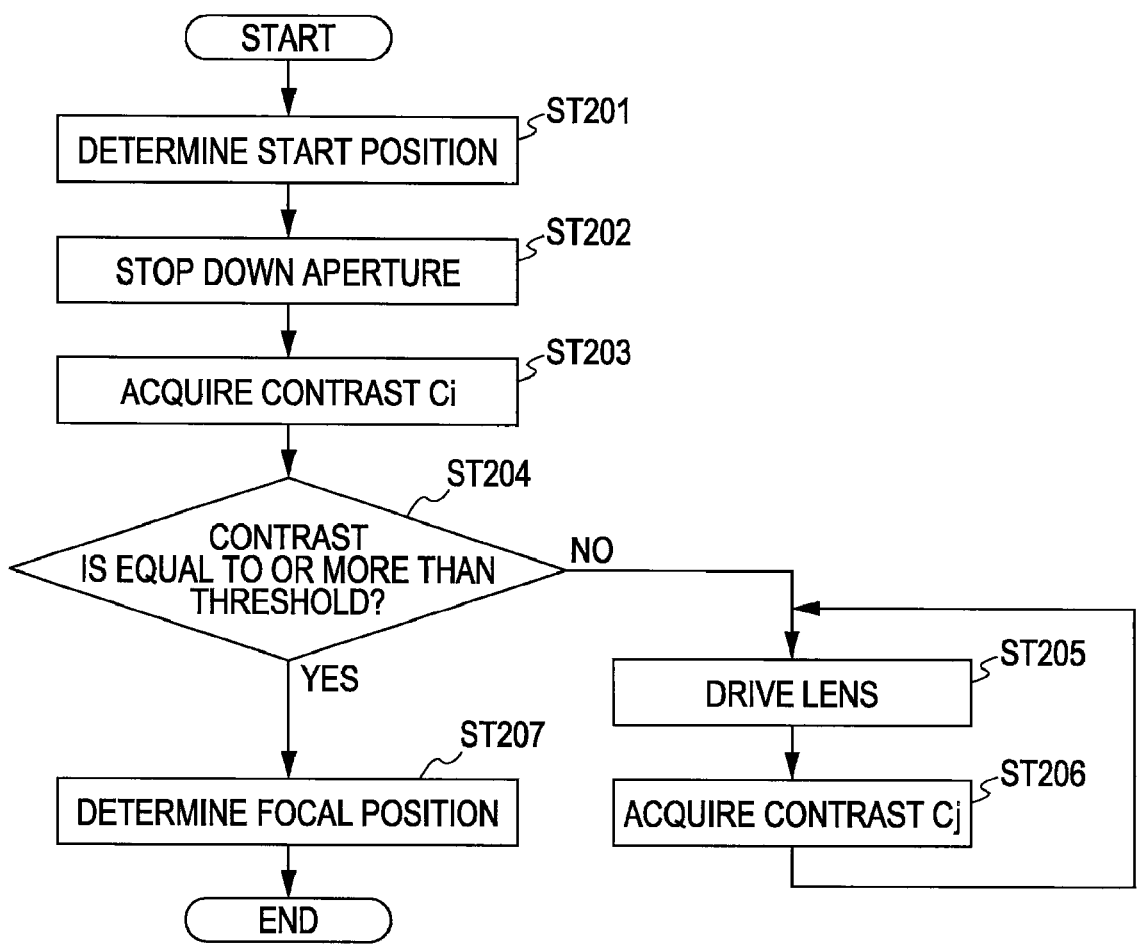
FIG. 10 is a flowchart of a focal-position determining procedure.
Figure 11:
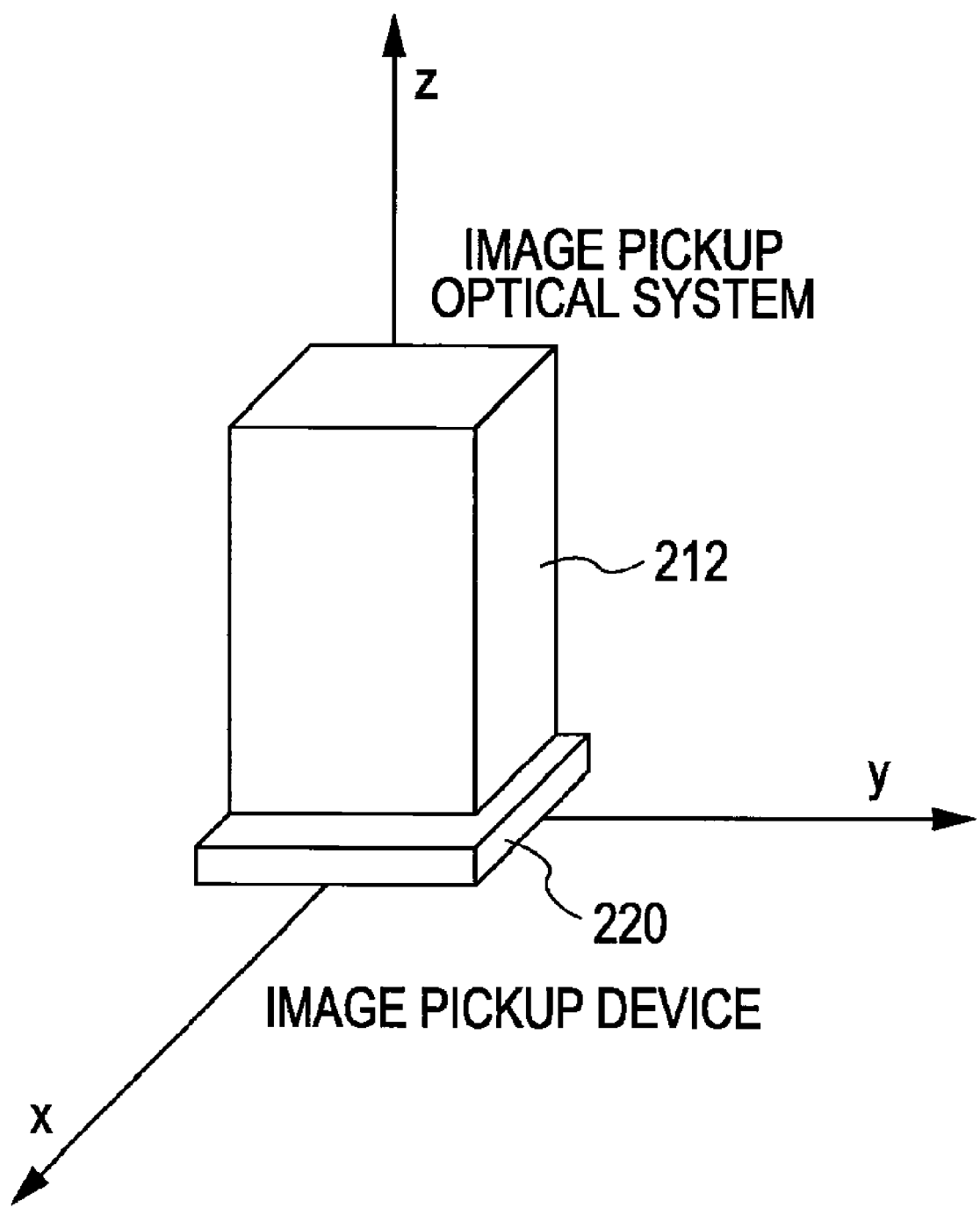
FIG. 11 is a diagram for explaining the focal-position determining procedure and illustrates a process of adjusting positions of the element-including optical system and the detector.
Figure 12:
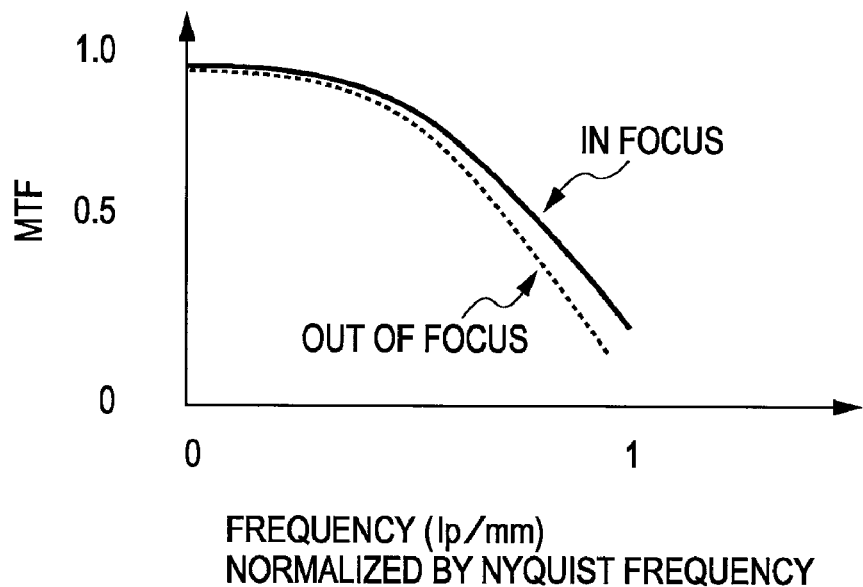
FIG. 12 is a diagram illustrating the MTF response obtained when an aperture is stopped down in a known optical system.

Next, a procedure for determining the focal position will be described below with reference to FIGS. 10 and 11.

First, the small aperture 211 is attached to the element-including lens system 212. Then, as shown in FIG. 11, the positions of the element-including lens system 212 and the sensor 220 are adjusted along x and y axes so that a chart can be taken.

After the position adjustment along the x and y axes, a start position is determined (ST201), the small aperture 211 is stopped down (ST202), and a contrast is measured at that position (ST203).

Then, it is determined whether or not the contrast is equal to or more than the threshold (ST204). If the contrast is not equal to or more than the threshold, the element-including lens system 212 is driven (ST205) and the contrast is measured again (ST206).

The element-including lens system 212 is driven until the contrast becomes equal to or more than the threshold. When the contrast becomes equal to or more than the threshold, the element-including lens system 212 and the sensor 220 are bonded to each other and the focal position is determined (ST207).

In the above-described step of driving the element-including lens system 212, the element-including lens system 212 is driven along the z axis (optical axis).

Figure 13:
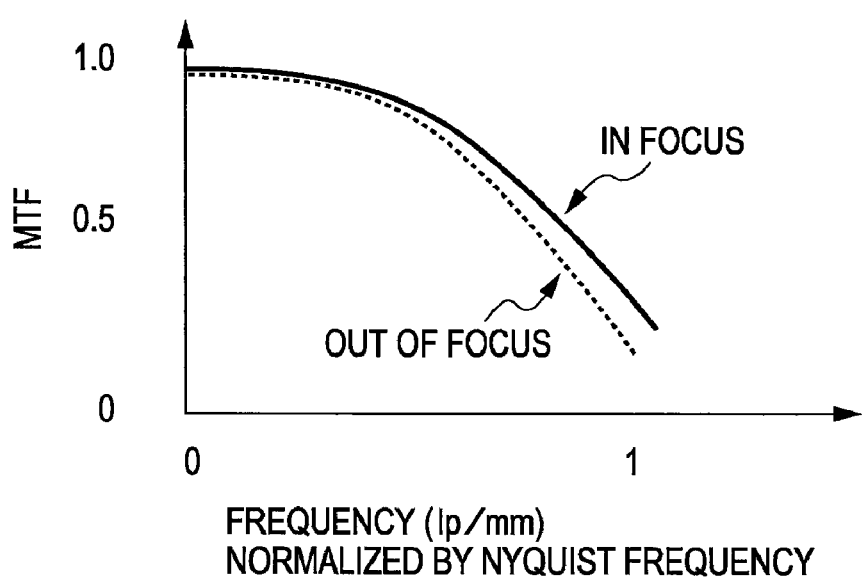
FIG. 13 is a diagram illustrating the MTF response obtained when an aperture is stopped down in the element-including optical system including an optical wavefront modulation element.

As shown in FIG. 13, when the small aperture 211 is stopped down, the effect of the phase modulation element 113a, that is, phase variation, is reduced and a response similar to that of a known optical system can be obtained. Therefore, as described above, the focal position can be adjusted by adjusting the attachment positions so as to increase the response. When such an adjustment is performed, a larger depth of field can be obtained compared to the case in which the adjustment is not performed.

Figure 14:
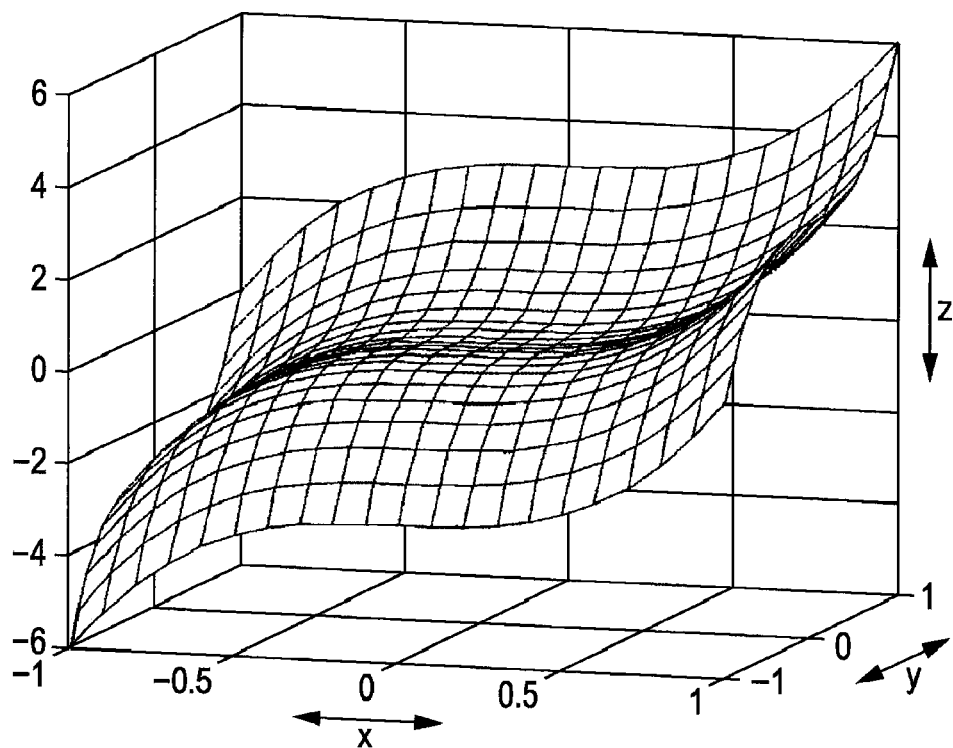
FIG. 14 is a diagram illustrating the shape of a wavefront aberration that can be expressed by a certain equation when an optical axis of the element-including optical system including the optical wavefront modulation element is z axis and two axes that are perpendicular to the z axis and to each other are x and y axes.

When the optical axis of the optical system including the optical wavefront modulation element according to the present embodiment is defined as z axis and two axes that are perpendicular to the z axis and to each other are defined as x and y axes, FIG. 14 shows the shape of wavefront aberration that is expressed as follows:

$$Z = \alpha'(x^3 + y^3)$$

where $|x| \leq 1$ and $|y| \leq 1$ are satisfied and Z indicates the wavefront aberration.

In an area where the wavefront aberration is $0.5\lambda$ or less, the phase variation is small and an OTF similar to that of a normal optical system can be obtained. Therefore, the attachment positions are adjusted by stopping down the aperture until the wavefront aberration is reduced to about $0.5\lambda$.

Figure 15:
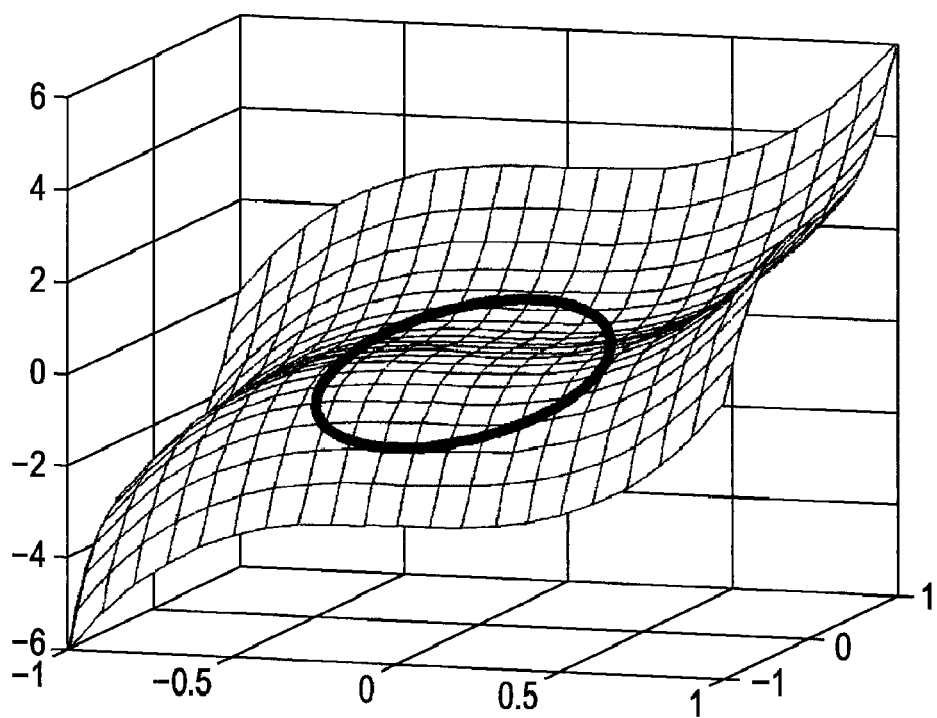
FIG. 15 illustrates the shape of the wavefront aberration in which the area where the wavefront aberration is 0.5λ or less is circled by a bold line.

FIG. 15 shows the shape of the wavefront aberration in which the area where the wavefront aberration is $0.5\lambda$ or less is circled by the bold line.

In the above description, $\lambda$ is a wavelength in the visible light region or infrared region.

FIG. 14 simply shows an example of the shape of the wavefront aberration, and the present invention is not limited to this as long as the phase can be expressed as follows:

$$z = \exp\left\{ i \times \left( \sum_{j=1} C_j x^m y^n \right) \right\}$$

where m and n are integers and $$j = \frac{[(m+n)^2 + m + 3n]}{2}, |x| \leq 1, \text{ and } |y| \leq 1$$

are satisfied, when the optical axis of the optical system is defined as z axis and two axes perpendicular to the z axis and to each other are defined as x and y axes.

As described above, the image processing device 140 receives the first image FIM from the detector 120 and performs a predetermined correction process for lifting the MTF of the first image with respect to the spatial frequency. Accordingly, a final high-definition image FNLIM is generated.

Figure 16:
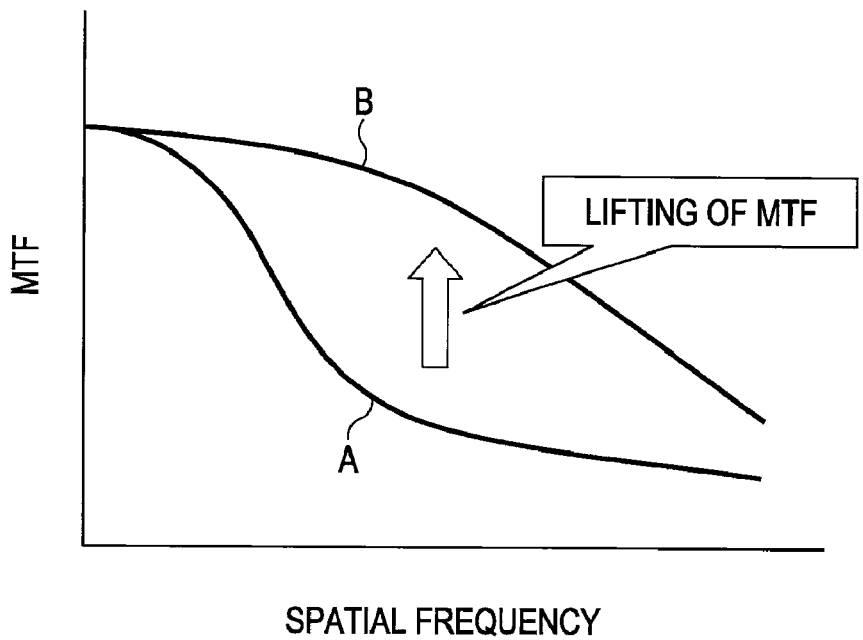
FIG. 16 is a diagram for explaining an MTF correction process performed by an image processing device according to the embodiment.

In the MTF correction process performed by the image processing device 140, the MTF of the first image, which is basically low as shown by the curve A in FIG. 16, is changed to an MTF closer to, or the same as, that shown by the curve B in FIG. 16 by performing post-processing including edge emphasis and chroma emphasis using the spatial frequency as a parameter. The characteristic shown by the curve B in FIG. 16 is obtained when, for example, the wavefront shape is not changed using the optical wavefront modulation element as in the present embodiment.

In the present embodiment, all of the corrections are performed using the spatial frequency as a parameter.

Figure 17:
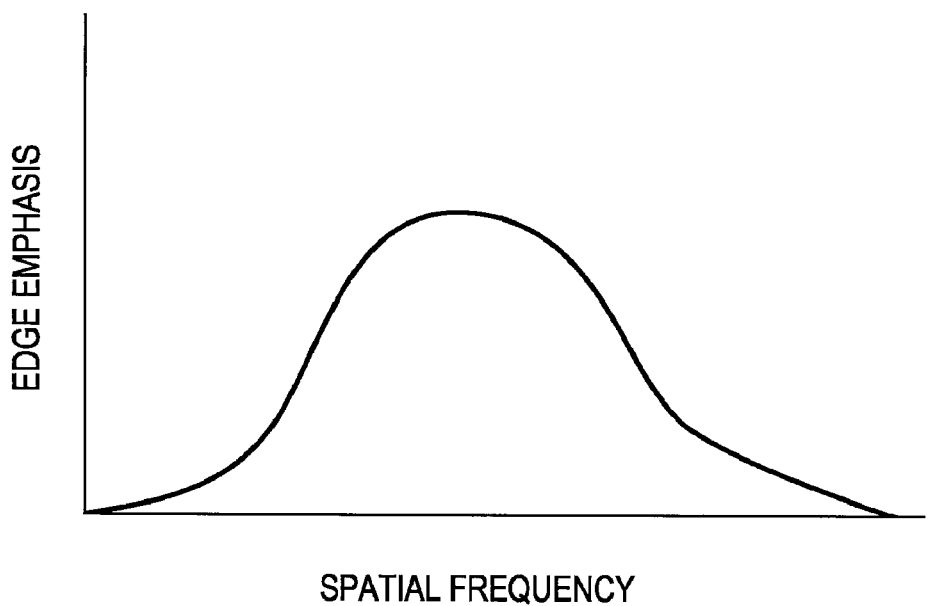
FIG. 17 is another diagram for explaining the MTF correction process performed by the image processing device.
Figure 18:
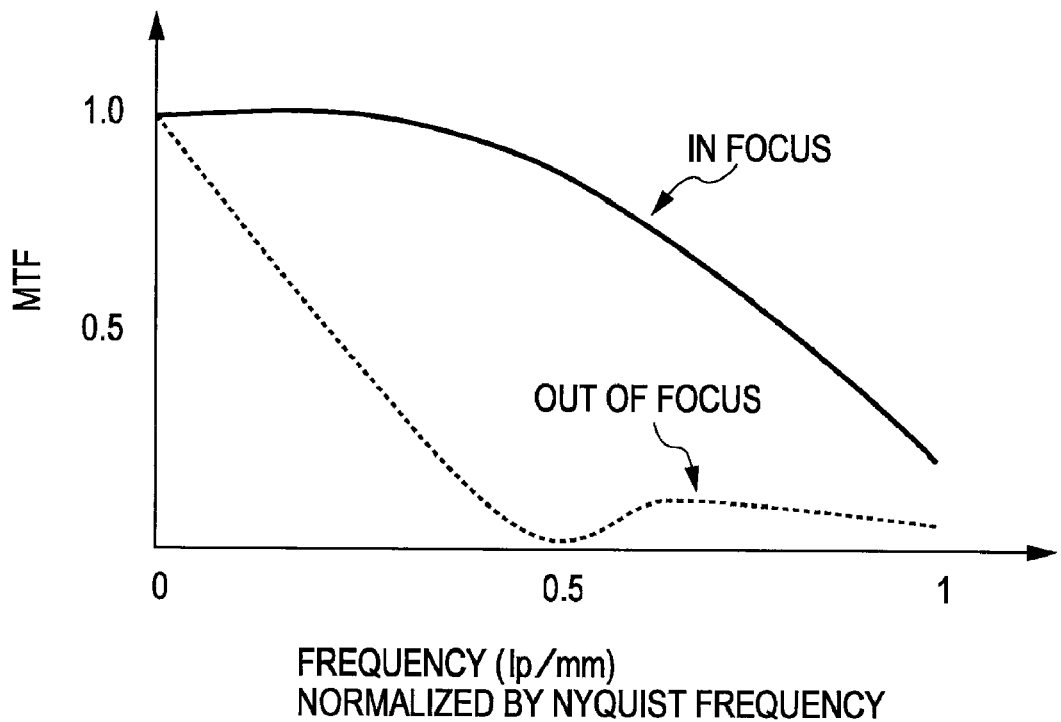
FIG. 18 is a diagram illustrating the MTF response obtained when an object is in focus and when the object is out of focus in the known optical system.

In the present embodiment, in order to obtain the final MTF characteristic curve B from the optically obtained MTF characteristic curve A with respect to the special frequency as shown in FIG. 16, the original image (first image) is corrected by performing edge emphasis or the like for each spatial frequency. For example, the MTF characteristic shown in FIG. 16 is processed with an edge emphasis curve with respect to the spatial frequency shown in FIG. 17.

More specifically, in a predetermined spatial frequency range, the degree of edge emphasis is reduced at a low-frequency side and a high-frequency side and is increased in an intermediate frequency region. Accordingly, the desired MTF characteristic curve B can be virtually obtained.

As described above, basically, the image pickup apparatus 100 according to the present embodiment includes the element-including optical system 110 and the detector 120 for obtaining the first image. In addition, the image pickup apparatus 100 also includes the image processing device 140 for forming the final high-definition image from the first image. The element-including optical system 110 is provided with an optical wavefront modulation element or an optical element, such as a glass element and a plastic element, having a surface processed so as to perform wavefront formation, so that the wavefront of light can be changed (modulated). The light with the modulated wavefront forms an image, i.e., the first image, on the imaging plane (light-receiving surface) of the detector 120 including a CCD or a CMOS sensor. The image pickup apparatus 100 according to the present embodiment is characterized in that the image pickup apparatus 100 functions as an image-forming system that can obtain a high-definition image from the first image through the image processing device 140.

In the present embodiment, the first image obtained by the detector 120 is in light conditions with an extremely large depth. Therefore, the MTF of the first image is basically low, and is corrected by the image processing device 140.

The image-forming process performed by the image pickup apparatus 100 according to the present embodiment will be discussed below from the wave-optical point of view.

When a spherical wave emitted from a single point of an object passes through an imaging optical system, the spherical wave is converted into a convergent wave. At this time, aberrations are generated unless the imaging optical system is an ideal optical system. Therefore, the wavefront shape is changed into a complex shape instead of a spherical shape. Wavefront optics is the science that connects geometrical optics with wave optics, and is useful in dealing with the phenomenon of wavefront.

When the wave-optical MTF at the focal point is considered, information of the wavefront at the exit pupil position in the imaging optical system becomes important.

The MTF can be calculated by the Fourier transform of wave-optical intensity distribution at the focal point. The wave-optical intensity distribution is obtained as a square of wave-optical amplitude distribution, which is obtained by the Fourier transform of a pupil function at the exit pupil.

The pupil function is the wavefront information (wavefront aberration) at the exit pupil position. Therefore, the MTF can be calculated if the wavefront aberration of the optical system 110 can be accurately calculated.

Accordingly, the MTF value at the imaging plane can be arbitrarily changed by changing the wavefront information at the exit pupil position by a predetermined process. Also in the present embodiment in which the wavefront shape is changed using the optical wavefront modulation element, desired wavefront formation is performed by varying the phase (the light path length along the light beam). When the desired wavefront formation is performed, light output from the exit pupil forms an image including portions where light rays are dense and portions where light rays are sparse, as is clear from the geometrical optical spot images shown in FIGS. 7A to 7C. In this state, the MTF value is low in regions where the spatial frequency is low and an acceptable resolution is obtained in regions where the spatial frequency is high. When the MTF value is low, in other words, when the above-mentioned geometrical optical spot images are obtained, aliasing does not occur. Therefore, it is not necessary to use a low-pass filter. Then, flare images, which cause the reduction in the MTF value, are removed by the image processing device 140 including the DSP or the like. Accordingly the MTF value can be considerably increased.

Next, an MTF response of the present embodiment and that of a known optical system will be discussed below.

In the element-including optical system including the optical wavefront modulation element, variation in the MTF response obtained when the object is out of focus is smaller than that in an optical system free from the optical wavefront modulation element. The MTF response is increased by subjecting the image formed by the element-including optical system including the optical wavefront modulation element to a process using a convolution filter.

Figure 19:
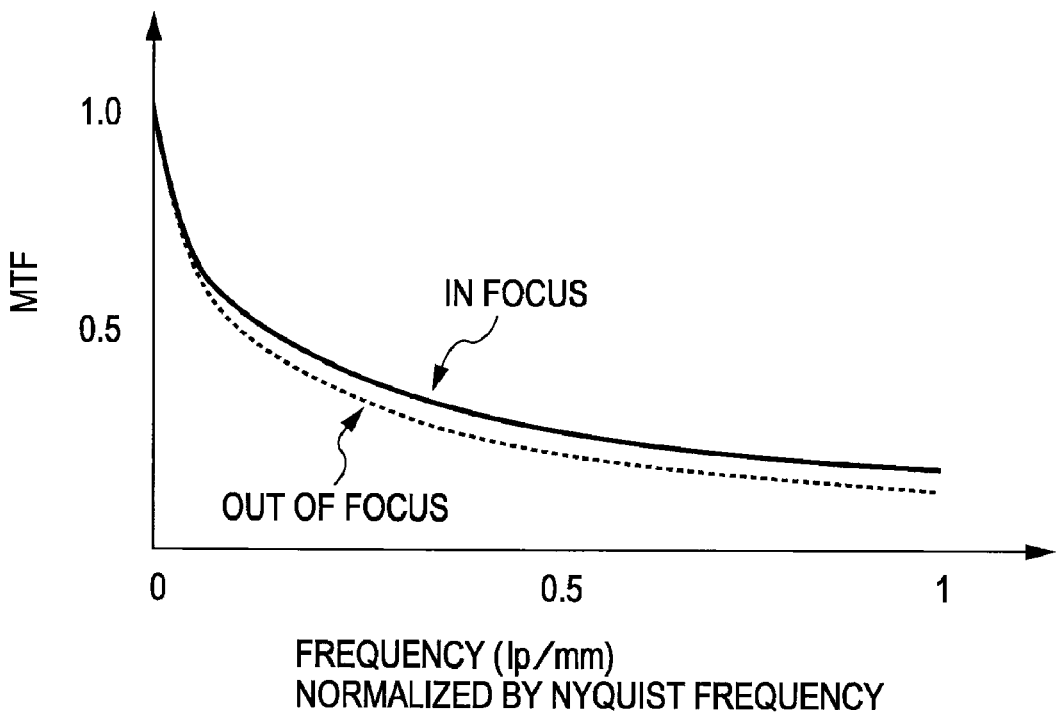
FIG. 19 is a diagram illustrating the MTF response obtained when an object is in focus and when the object is out of focus in the element-including optical system including the optical wavefront modulation element according to the embodiment.

FIG. 19 shows the absolute value of the OTF (MTF) of the optical system having the phase plate. The MTF value is preferably 0.1 or more at the Nyquist frequency.

Figure 20:
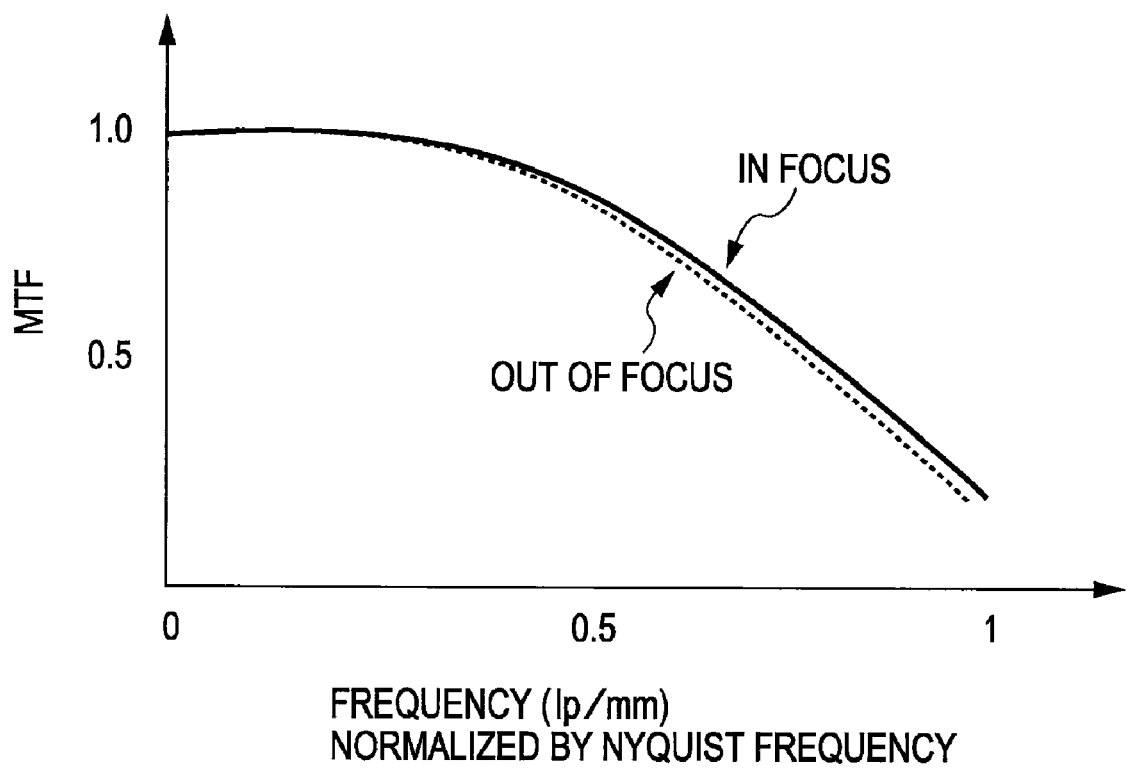
FIG. 20 is a diagram illustrating the MTF response obtained after data reconstruction in the image pickup apparatus according to the embodiment.

The reason for this will be described below. In order to obtain the OTF shown in FIG. 20 after reconstruction, the gain is increased by the reconstruction filter. However, at this time, the sensor noise is also increased. Therefore, preferably, reconstruction is performed without largely increasing the gain in a high-frequency range around the Nyquist frequency.

In a normal optical system, sufficient resolution can be obtained if the MTF value at the Nyquist frequency is 0.1 or more.

Therefore, if the MTF value is 0.1 or more before reconstruction, it is not necessary to increase the gain at the Nyquist frequency by the reconstruction filter. If the MTF value is less than 0.1 before reconstruction, the reconstructed image is largely influenced by noise.

The structure of the image processing device 140 and processes performed thereby will be described below.

As shown in FIG. 1, the image processing device 140 includes a RAW buffer memory 141, a convolution operator 142, a kernel data storage ROM 143 that functions as memory means, and a convolution controller 144.

The convolution controller 144 is controlled by the controller 190 so as to turn on/off the convolution process, control the screen size, and switch kernel data.

Figures 23, 24:
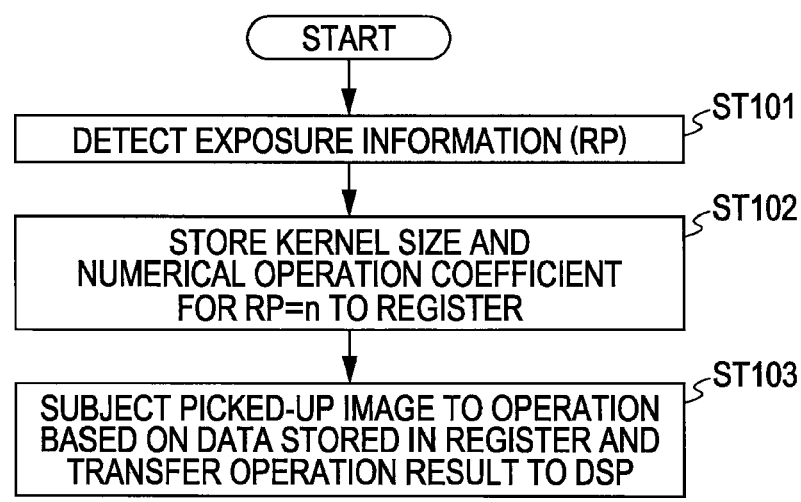
FIG. 23 is a diagram illustrating another example of data stored in a kernel data ROM (object distance)
FIG. 24 is a flowchart of a switching process performed by the controller 190 in accordance with the exposure information including the aperture information.

As shown in FIGS. 21, 22, and 23, the kernel data storage ROM 143 stores kernel data for the convolution process that are calculated in advance on the basis of the PSF in of the optical system. The kernel data storage ROM 143 acquires exposure information, which is determined when the exposure settings are made by the controller 190, and the kernel data is selected through the convolution controller 144.

The exposure information includes aperture information.

In the example shown in FIG. 21, kernel data A corresponds to an optical magnification of 1.5, kernel data B corresponds to an optical magnification of 5, and kernel data C corresponds to an optical magnification of 10.

In the example shown in FIG. 22, kernel data A corresponds to an F number, which is the aperture information, of 2.8, and kernel data B corresponds to an F number of 4. The F numbers 2.8 and 4 are out of the above-described area where the wavefront aberration is 0.5λ or less.

In the example shown in FIG. 23, kernel data A corresponds to an object distance of 100 mm, kernel data B corresponds to an object distance of 500 mm, and kernel data C corresponds to an object distance of 4 m.

The filtering process is performed in accordance with the aperture information, as in the example shown in FIG. 22, for the following reasons.

That is, when the aperture is stopped down to shoot an object, the phase plate 113*a* that functions as the optical wavefront modulation element is covered by the aperture stop. Therefore, the phase is changed and suitable image reconstruction cannot be performed.

Therefore, according to the present embodiment, a filtering process corresponding to the aperture information included in the exposure information is performed as in this example, so that suitable image reconstruction can be performed.

FIG. 24 is a flowchart of a switching process performed by the controller 190 in accordance with the exposure information including the aperture information.

First, exposure information (RP) is detected (ST101), and is supplied to the convolution controller 144.

The convolution controller 144 sets the kernel size and the numerical coefficient in a register on the basis of the exposure information RP (ST102).

The image data obtained by the detector 120 and input to the two-dimensional convolution operator 142 through the AFE unit 130 is subjected to the convolution operation based on the data stored in the register. Then, the data obtained by the operation is transmitted to the signal processor 150 (ST103).

The signal processor 150 and the kernel data storage ROM 143 of the image processing device 140 will be described in more detail below.

FIGS. 25 to 28 are block diagrams illustrating first to fourth examples of the image processing device 140. For simplicity, the AFE unit and the like are omitted. These examples correspond to the case in which filter kernel data is prepared in advance in association with the exposure information.

Figure 25:
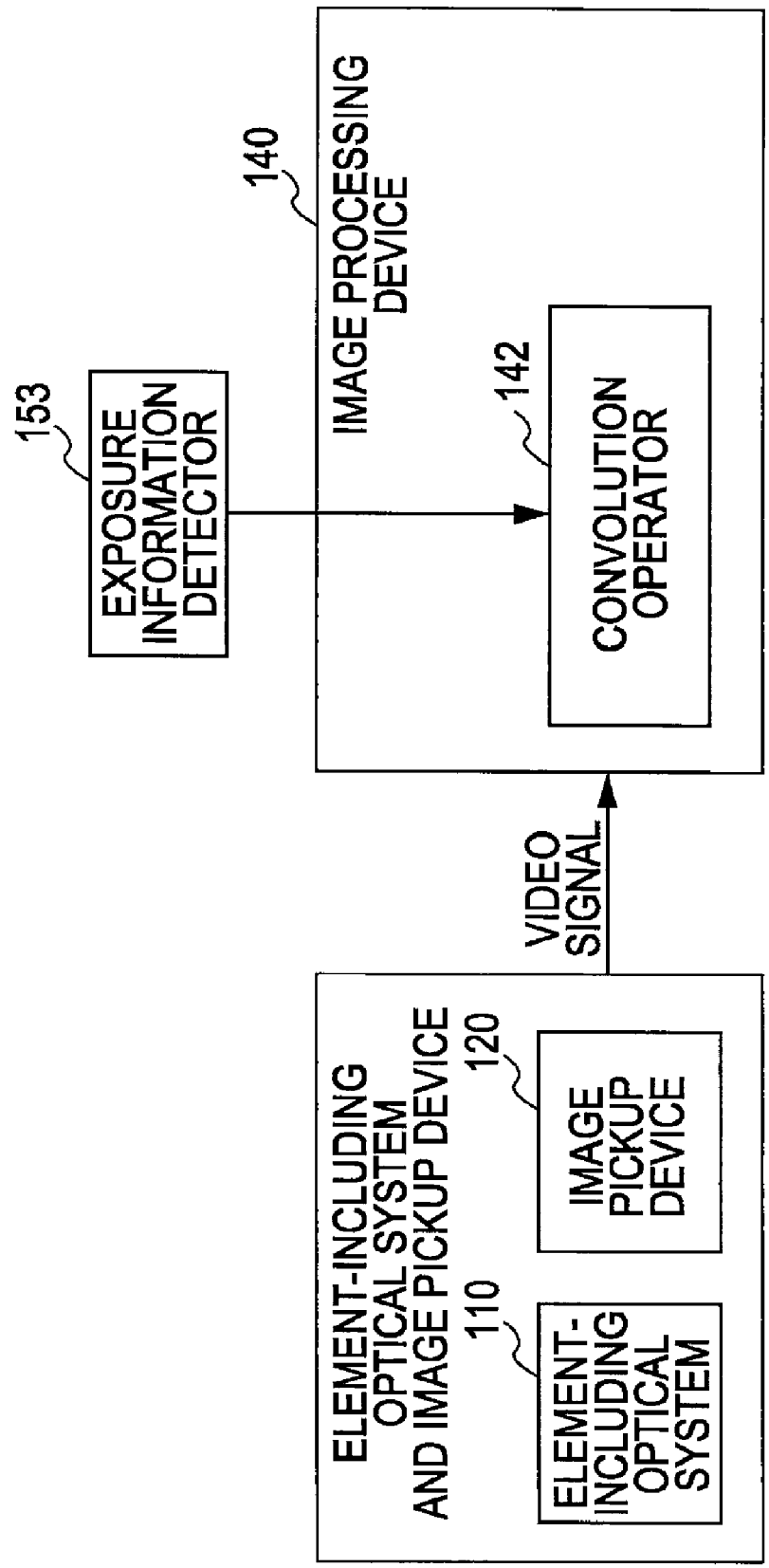
FIG. 25 illustrates a first example of the structure including a signal processor and a kernel data storage ROM.

Referring to FIG. 25, the image processing device 140 receives the exposure information that is determined when the exposure settings are made from an exposure information detector 153 and selects kernel data through the convolution controller 144. The two-dimensional convolution operator 142 performs the convolution process using the kernel data.

Figure 26:
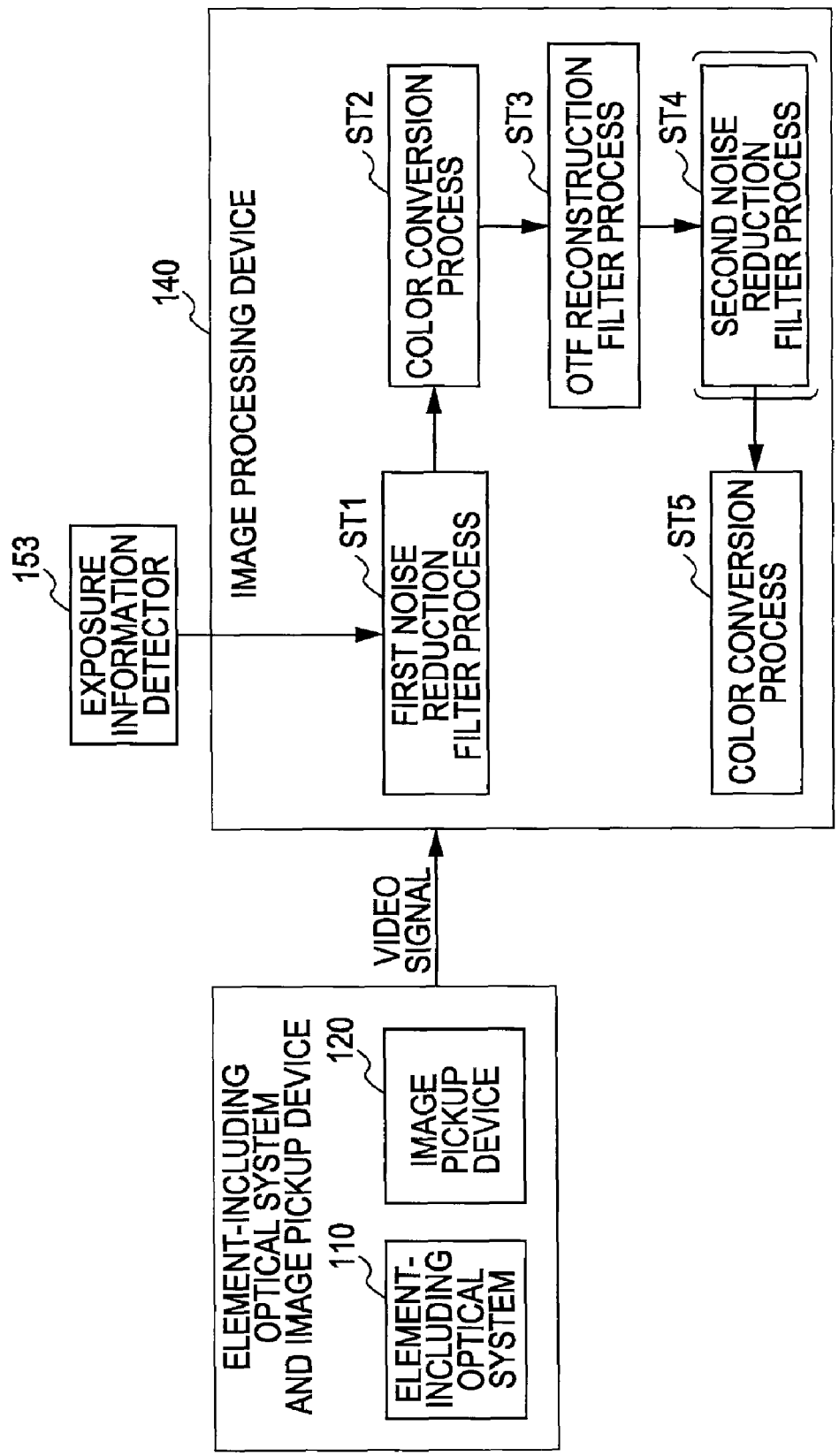
FIG. 26 illustrates a second example of the structure including a signal processor and a kernel data storage ROM.

In the example shown in FIG. 26, the image processing device 140 performs a first noise-reduction filtering process ST1. The first noise-reduction filtering process ST1 is prepared in advance as the filter kernel data in association with the exposure information.

The exposure information determined when the exposure settings are made is detected by the exposure information detector 153 and the kernel data is selected through the convolution controller 144.

After the first noise-reduction filtering process ST1, the two-dimensional convolution operator 142 performs a color conversion process ST2 for converting the color space and then performs the convolution process (OTF reconstruction filtering process) ST3 using the kernel data.

Then, a second noise-reduction filtering process ST4 is performed and the color space is returned to the original state by a color conversion process ST5. The color conversion processes may be, for example, YCbCr conversion. However, other kinds of conversion processes may also be performed. The second noise-reduction filtering process ST4 may be omitted.

Figure 27:
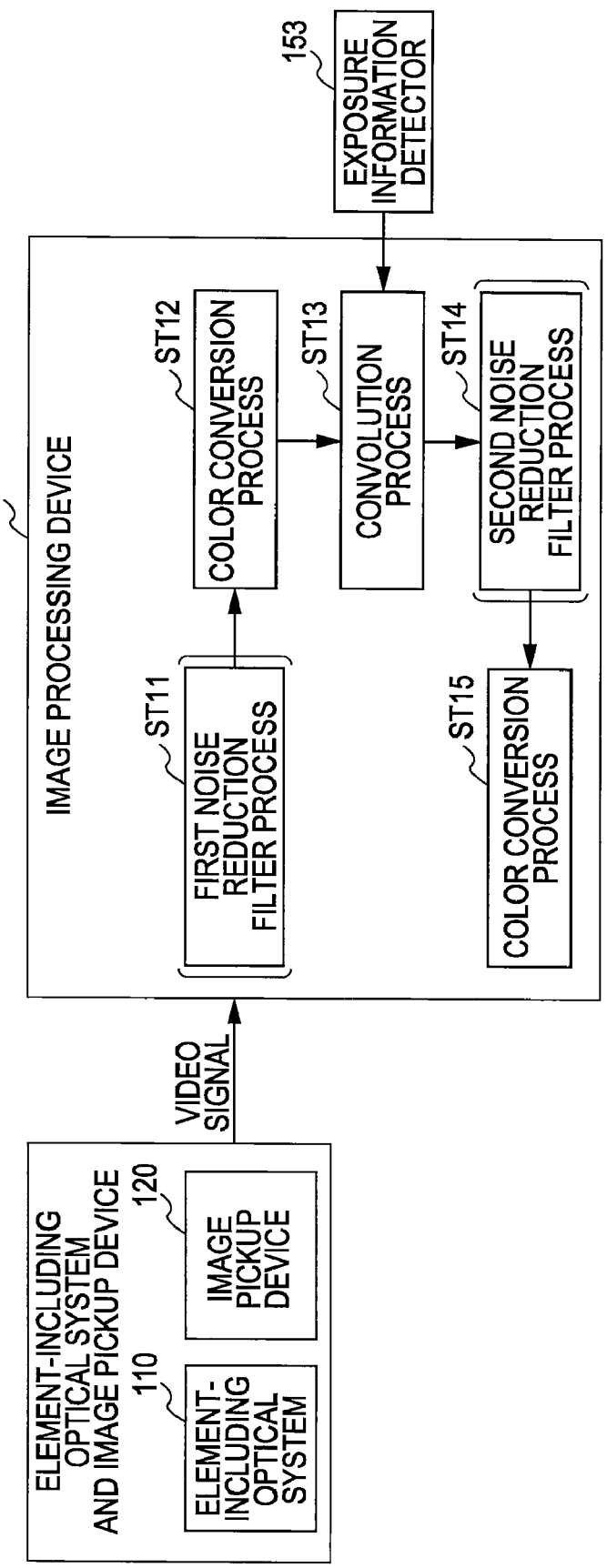
FIG. 27 illustrates a third example of the structure including a signal processor and a kernel data storage ROM.

FIG. 27 is a block diagram illustrating the case in which an OTF reconstruction filter is prepared in advance in association with the exposure information.

The exposure information determined when the exposure settings are made is obtained by the exposure information detector 153 and the kernel data is selected through the convolution controller 144.

After a first noise-reduction filtering process ST11 and a color conversion process ST12, the two-dimensional convolution operator 142 performs a convolution process ST13 using the OTF reconstruction filter.

Then, a second noise-reduction filtering process ST14 is performed and the color space is returned to the original state by a color conversion process ST15. The color conversion processes may be, for example, YCbCr conversion. However, other kinds of conversion processes may also be performed.

One of the first and second noise-reduction filtering processes ST11 and ST14 may also be omitted.

Figure 28:
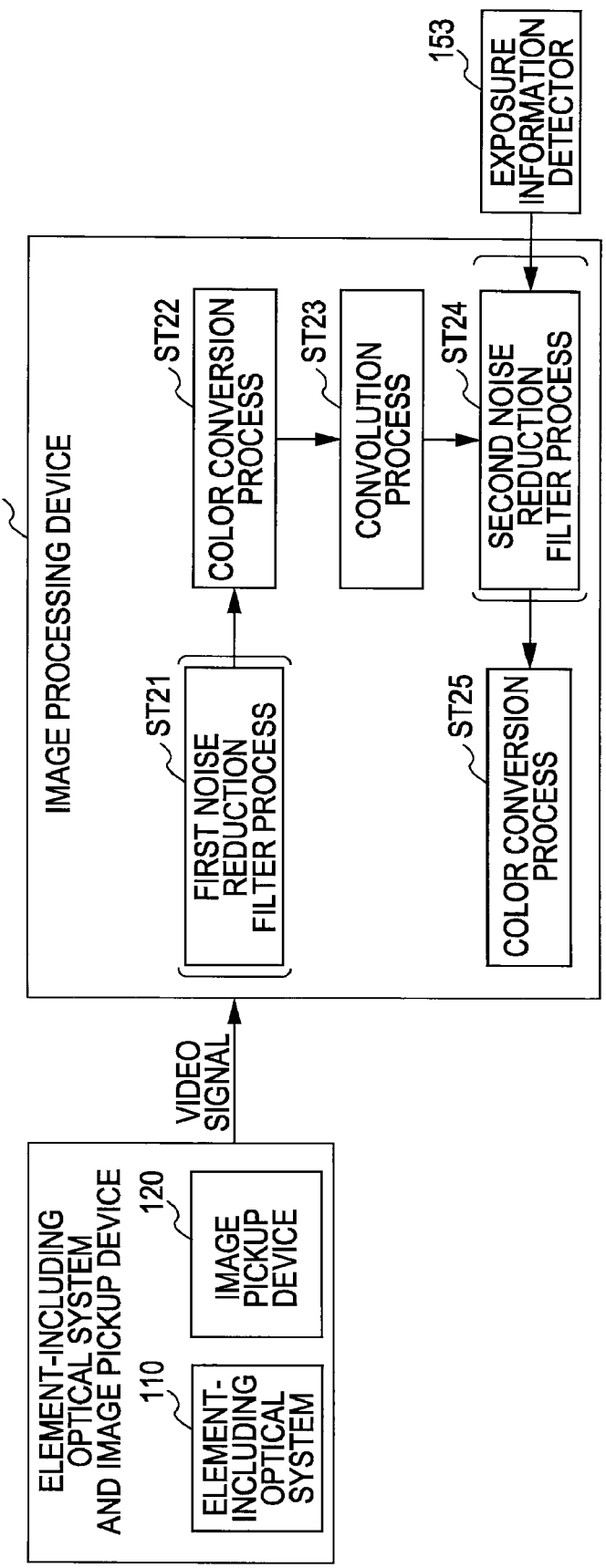
FIG. 28 illustrates a fourth example of the structure including a signal processor and a kernel data storage ROM.

In the example shown in FIG. 28, noise-reduction filtering processes are performed and a noise reduction filter is prepared in advance as the filter kernel data in association with the exposure information.

A second noise-reduction filtering process ST24 may also be omitted.

The exposure information determined when the exposure settings are made is acquired by the exposure information detector 153 and the kernel data is selected through the convolution controller 144.

After a first noise-reduction filtering process ST21, the two-dimensional convolution operator 142 performs a color conversion process ST22 for converting the color space and then performs the convolution process ST23 using the kernel data.

Then, the second noise-reduction filtering process ST24 is performed in accordance with the exposure information and the color space is returned to the original state by a color conversion process ST25. The color conversion processes may be, for example, YCbCr conversion. However, other kinds of conversion processes may also be performed.

The first noise-reduction filtering process ST21 may also be omitted.

In the above-described examples, the filtering process is performed by the two-dimensional convolution operator 142 in accordance with only the exposure information. However, the exposure information may also be used in combination with, for example, object distance information, zoom information, or shooting-mode information so that a more suitable coefficient can be extracted or a suitable operation can be performed.

Figure 29:
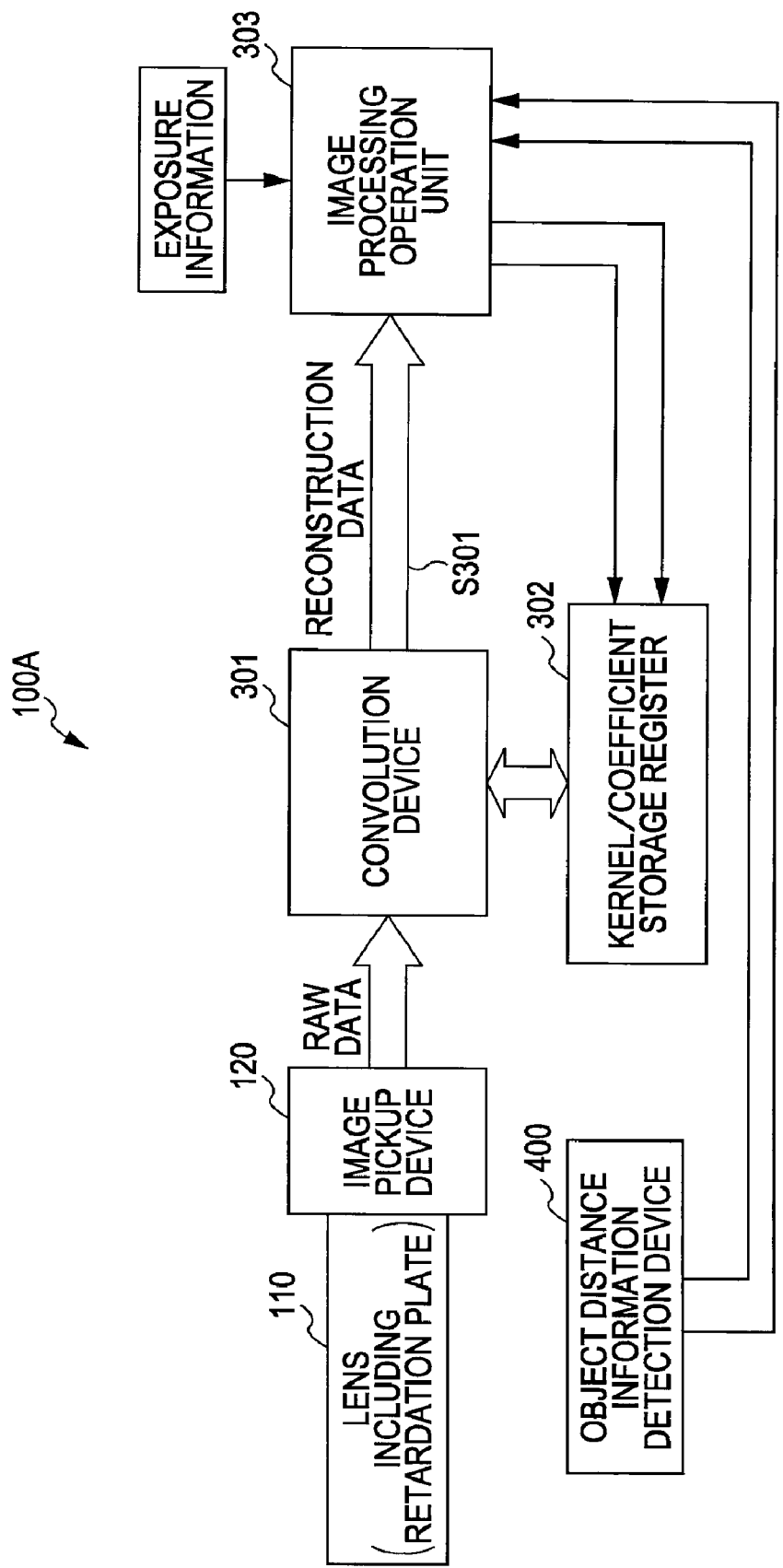
FIG. 29 illustrates an example of the structure of the image processing device in which object distance information and exposure information are used in combination.

FIG. 29 shows an example of the structure of an image processing device in which the object distance information and the exposure information are used in combination. An image pickup apparatus 100A generates an image signal with a smaller blur than that of a blurred object-image signal obtained from a detector 120. As shown in FIG. 29, the image pickup apparatus 100A includes a convolution device 301, a kernel/coefficient storage register 302, and an image processing operation unit 303.

In the image pickup apparatus 100A, the image processing operation unit 303 reads information regarding an approximate distance to the object and exposure information from an object-distance-information detection device 400, and determines a kernel size and a coefficient for use in an operation suitable for the object position. The image processing operation unit 303 stores the kernel size and the coefficient in the kernel/coefficient storage register 302. The convolution device 301 performs the suitable operation using the kernel size and the coefficient so as to reconstruct the image.

The above-described image processing is performed by the convolution operation. To achieve the convolution operation, a single, common coefficient may be stored and a correction coefficient may be stored in association with the focal distance. In such a case, the coefficient is corrected using the correction coefficient so that a suitable convolution operation can be performed using the corrected coefficient.

Alternatively, the following structures may also be used.

That is, a kernel size and a coefficient for the convolution operation may be directly stored in advance in association with the focal distance, and the convolution operation may be performed using the thus-stored kernel size and coefficient. Alternatively, the coefficient may be stored in advance as a function of focal distance. In this case, the coefficient to be used in the convolution operation may be calculated from this function in accordance with the focal distance.

More specifically, in the apparatus shown in FIG. 29, the following structure may be used.

That is, the kernel/coefficient storage register 302 functions as conversion-coefficient storing means and stores at least two coefficients corresponding to the aberration caused by at least the phase plate 113a in association with the object distance. The image processing operation unit 303 functions as coefficient-selecting means for selecting one of the coefficients stored in the kernel/coefficient storage register 302. More specifically, the image processing operation unit 303 selects a coefficient that corresponds to the object distance on the basis of information generated by the object-distance-information detection device 400 that functions as object-distance-information generating means.

Then, the convolution device 301, which functions as converting means, converts the image signal using the coefficient selected by the image processing operation unit 303 which functions as the coefficient-selecting means.

Alternatively, as described above, the image processing operation unit 303 functions as conversion-coefficient calculating means and calculates the coefficient on the basis of the information generated by the object-distance-information detection device 400 which functions as the object-distance-information generating means. The thus-calculated coefficient is stored in the kernel/coefficient storage register 302.

Then, the convolution device 301, which functions as the converting means, converts the image signal using the coefficient obtained by the image processing operation unit 303 which functions as the conversion-coefficient calculating means and stored in the kernel/coefficient storage register 302.

Alternatively, the kernel/coefficient storage register 302 functions as correction-value storing means and stores at least one correction value in association with a zoom position or an amount of zoom of the element-including zoom optical system 110. The correction value includes a kernel size of an object aberration image.

The kernel/coefficient storage register 302 also functions as second conversion-coefficient storing means and stores a coefficient corresponding to the aberration caused by the phase plate 113a in advance.

Then, the image processing operation unit 303 functions as correction-value selecting means and selects a correction value from one or more correction values stored in the kernel/coefficient storage register 302 that functions as the correction-value storing means. More specifically, the image processing operation unit 303 selects a correction value that corresponds to the object distance on the basis of the distance information generated by the object-distance-information detection device 400 that functions as the object-distance-information generating means.

Then, the convolution device 301, which functions as the converting means, converts the image signal using the coefficient obtained from the kernel/coefficient storage register 302, which functions as the second conversion-coefficient storing means, and the correction value selected by the image processing operation unit 303, which functions as the correction-value selecting means.

Figure 30:
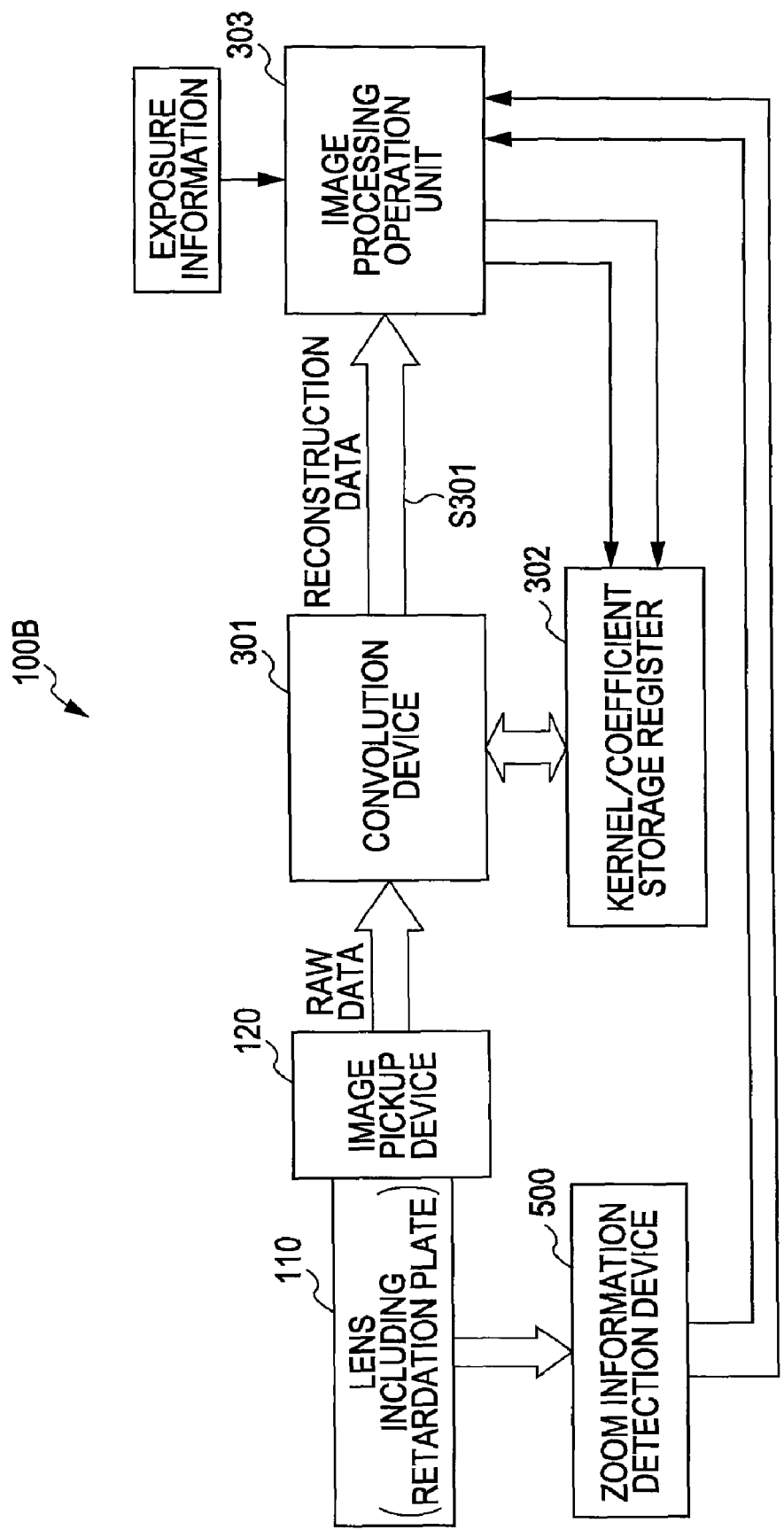
FIG. 30 illustrates an example of the structure of the image processing device in which zoom information and the exposure information are used in combination.

FIG. 30 shows an example of the structure of an image processing device in which zoom information and exposure information are used in combination.

Referring to FIG. 30, an image pickup apparatus 100B generates an image signal with a smaller blur than that of a blurred object-image signal obtained from a detector 120.

Similar to the image pickup apparatus 100A shown in FIG. 29, the image pickup apparatus 100B includes a convolution device 301, a kernel/coefficient storage register 302, and an image processing operation unit 303.

In the image pickup apparatus 100B, the image processing operation unit 303 reads information regarding the zoom position or the amount of zoom and the exposure information from the zoom information detection device 500. The kernel/coefficient storage register 302 stores kernel size data and coefficient data, and transmits a kernel size and a coefficient suitable for the exposure information and the zoom position obtained from the image processing operation unit 303 to the convolution device 301. Accordingly, the convolution device 301 performs a suitable operation so as to reconstruct the image.

As described above, in the case in which the phase plate, which functions as the optical wavefront modulation element, is included in the zoom optical system of the image pickup apparatus, the generated spot image differs in accordance with the zoom position of the zoom optical system. Therefore, in order to obtain a suitable in-focus image by subjecting an out-of-focus image (spot image) obtained by the phase plate to the convolution operation performed by the DSP or the like, the convolution operation that differs in accordance with the zoom position must be performed.

Accordingly, in the present embodiment, the zoom information detection device 500 is provided so that a suitable convolution operation can be performed in accordance with the zoom position and a suitable in-focus image can be obtained irrespective of the zoom position.

In the convolution operation performed by the image processing device 100B, a signal, common coefficient for the convolution operation may be stored in the kernel/coefficient storage register 302.

Alternatively, the following structures may also be used.

That is, a correction coefficient may be stored in the kernel/coefficient storage register 302 in association with the zoom position, and the coefficient may be corrected using the correction coefficient. Accordingly, the following structures may be adopted:

(1) The structure in which a suitable convolution operation is performed using a corrected coefficient (by the convolution device 301).

(2) The structure in which a kernel size and a coefficient for the convolution operation are directly stored in advance in the kernel/coefficient storage register 302 in association with the zoom position, and the convolution operation is performed using the thus-stored kernel size and coefficient (by the convolution device 301).

(3) The structure in which the coefficient is stored in advance in the kernel/coefficient storage register 302 as a function of zoom position, and the convolution operation is performed on the basis of a calculated coefficient (by the convolution device 301).

More specifically, in the apparatus shown in FIG. 30, the following structure may be used.

That is, the kernel/coefficient storage register 302 functions as conversion-coefficient storing means and stores at least two coefficients corresponding to the aberration caused by the phase plate 113a in association with the zoom position or the amount of zoom in the element-including zoom optical system 110. The image processing operation unit 303 functions as coefficient-selecting means for selecting one of the coefficients stored in the kernel/coefficient storage register 302. More specifically, the image processing operation unit 303 selects a coefficient that corresponds to the zoom position or the amount of zoom of the element-including zoom optical system 110 on the basis of information generated by the zoom information detection device 500 that functions as zoom-information generating means.

Then, the convolution device 301, which functions as a converting means, converts the image signal using the coefficient selected by the image processing operation unit 303 which functions as the coefficient-selecting means.

Alternatively, as described above with reference to FIG. 29, the image processing operation unit 303 functions as a conversion-coefficient calculating means and calculates the coefficient on the basis of the information generated by the zoom information detection device 500 which functions as the zoom-information generating means. The thus-calculated coefficient is stored in the kernel/coefficient storage register 302.

Then, the convolution device 301, which functions as the converting means, converts the image signal on the basis of the coefficient obtained by the image processing operation unit 303, which functions as the conversion-coefficient calculating means, and stores it in the kernel/coefficient storage register 302.

Alternatively, the kernel/coefficient storage register 302 functions as correction-value storing means and stores at least one correction value in association with the zoom position or the amount of zoom of the element-including zoom optical system 110. The correction value includes a kernel size of an object aberration image.

The kernel/coefficient storage register 302 also functions as second conversion-coefficient storing means and stores a coefficient corresponding to the aberration caused by the phase plate 113a in advance.

Then, the image processing operation unit 303 functions as correction-value selecting means and selects a correction value from one or more correction values stored in the kernel/coefficient storage register 302, which functions as the correction-value storing means. More specifically, the image processing operation unit 303 selects a correction value that corresponds to the zoom position or the amount of zoom of the element-including zoom optical system on the basis of the zoom information generated by the zoom information detection device 500 that functions as the zoom-information generating means.

Then, the convolution device 301, which functions as the converting means, converts the image signal using the coefficient obtained from the kernel/coefficient storage register 302, which functions as the second conversion-coefficient storing means, and the correction value selected by the image processing operation unit 303, which functions as the correction-value selecting means.

Figure 31:
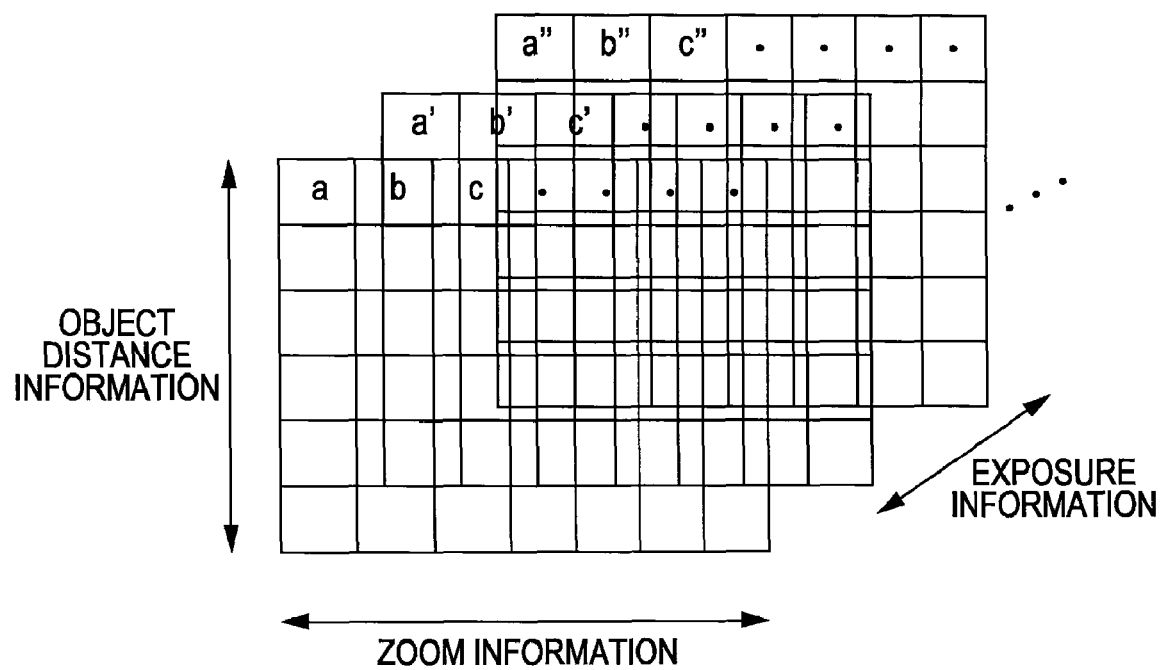
FIG. 31 illustrates an example of a filter structure applied when the exposure information, the object distance information, and the zoom information are used in combination.
Figure 32:
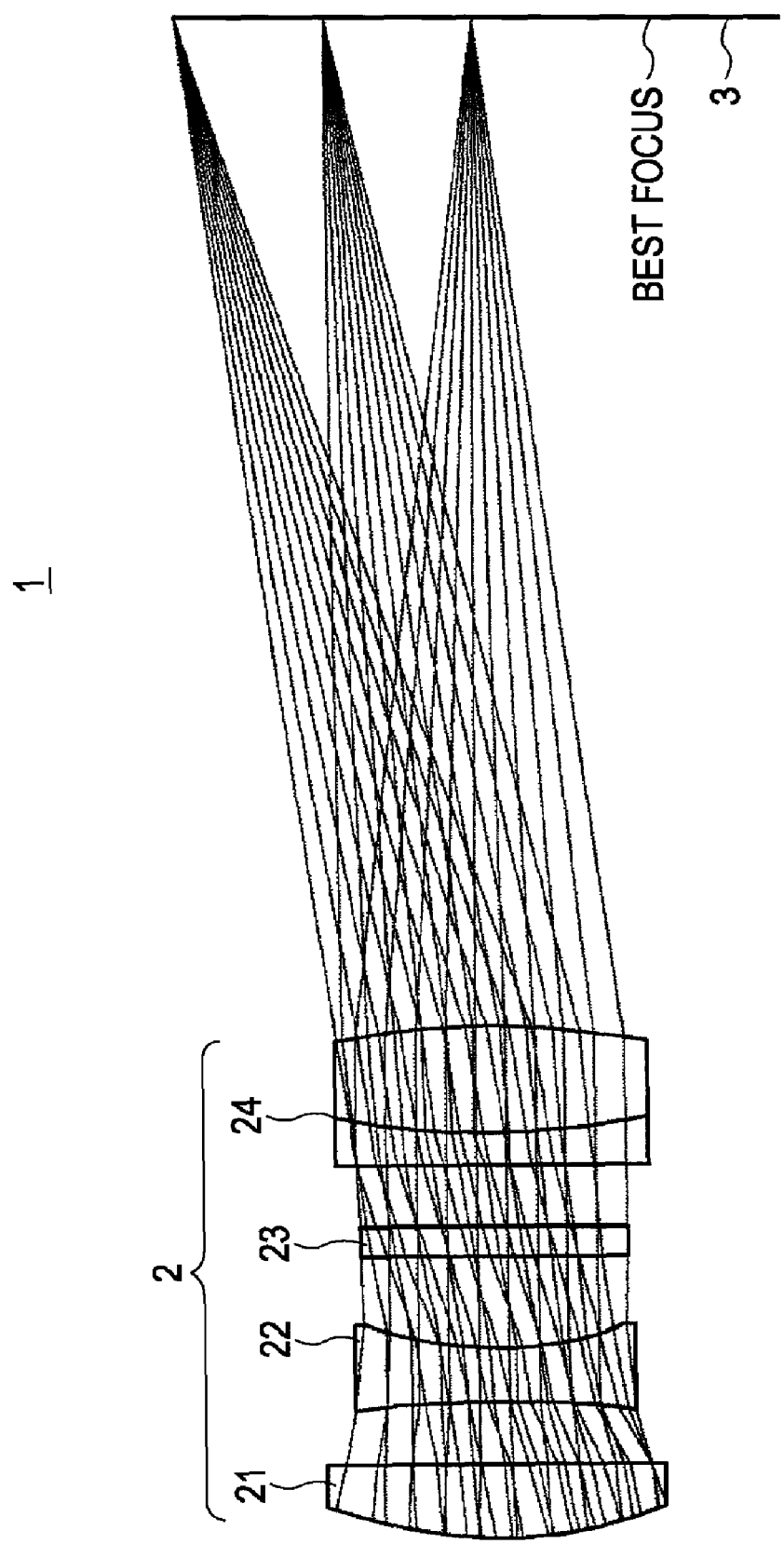
FIG. 32 is a schematic diagram illustrating the structure of a known image pickup apparatus and the state of ray bundles.
Figure 33A:
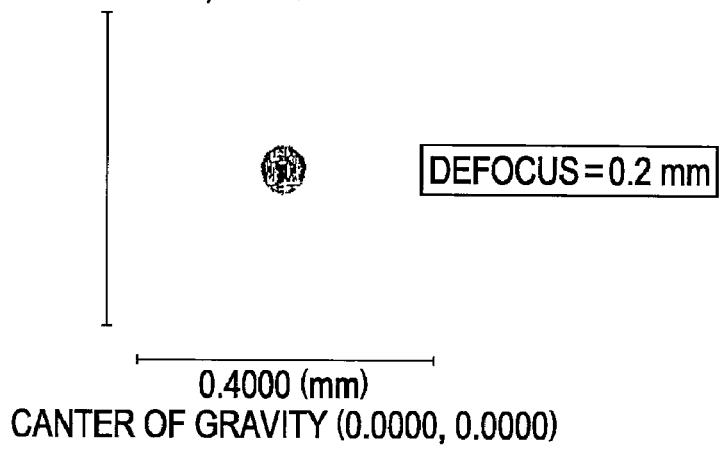
FIG. 33A illustrates a spot image formed on a light-receiving surface of a detector in the image pickup apparatus shown in FIG. 32 when a focal point is displaced by 0.2 mm (Defocus=0.2 mm)
Figure 33B:
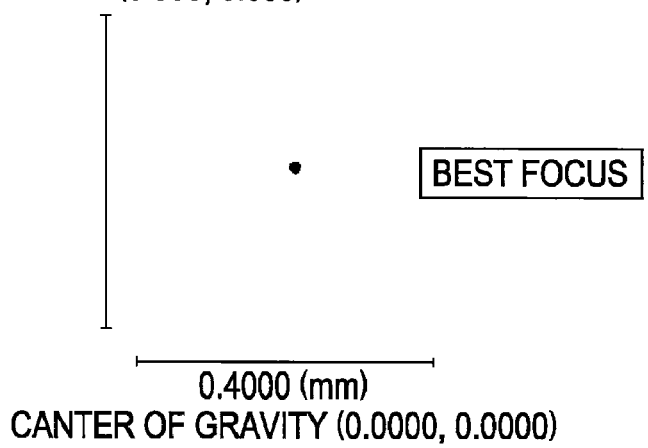
FIG. 33B illustrates a spot image formed on the light-receiving surface of the detector in the image pickup apparatus shown in FIG. 32 when the focal point is not displaced (Best focus)
Figure 33C:
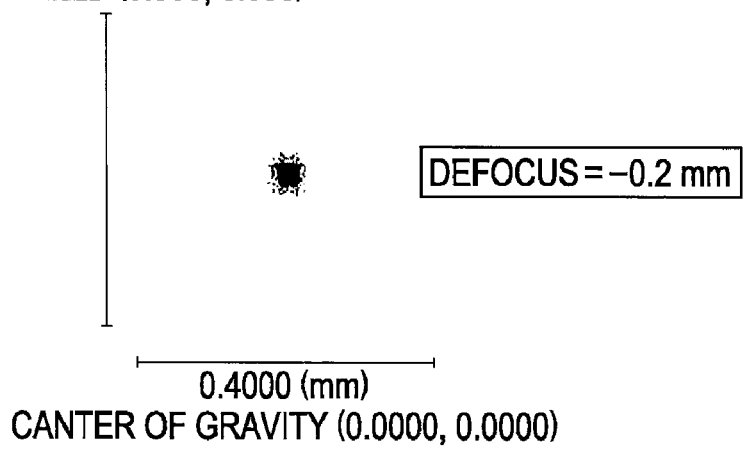
FIG. 33C illustrates a spot image formed on the light-receiving surface of the detector in the image pickup apparatus shown in FIG. 32 when the focal point is displaced by −0.2 mm (Defocus=−0.2 mm).

FIG. 31 shows an example of a filter structure used when the exposure information, the object distance information, and the zoom information are used in combination. In this example, a two-dimensional information structure is formed by the object distance information and the zoom information, and the exposure information elements are arranged along the depth.

Figure 4:
FIG. 4 is a diagram illustrating the shapes of spot images formed at the image height center by the image pickup apparatus having the zoom function at the wide-angle position.
Figure 5:
FIG. 5 is a diagram illustrating the shapes of spot images formed at the image height center by the image pickup apparatus having the zoom function at the telephoto position.

FIGS. 2 and 3 show an example of an element-including optical system, and an element-including optical system according to the present invention is not limited to that shown in FIGS. 2 and 3. In addition, FIGS. 4 and 5 show examples of spot shapes, and the spot shapes of the present embodiment are not limited to those shown in FIGS. 4 and 5.

The kernel data storage ROM is not limit to those storing the kernel sizes and values in association the optical magnification, the F number, and the object distance information, as shown in FIGS. 21, 22, and 23. In addition, the number of kernel data elements to be prepared is not limited to three.

Although the amount of information to be stored is increased as the number of dimensions thereof is increased to three, as shown in FIG. 31, or more, a more suitable selection can be performed on the basis of various conditions in such a case. The information to be stored includes the exposure information, the object distance information, the zoom information, etc., as described above.

In the image pickup apparatus including the phase plate as the optical wavefront modulation element, as described above, a suitable image signal without aberration can be obtained by image processing when the focal distance is within a predetermined focal distance range. However, when the focal distance is outside the predetermined focal distance range, there is a limit to the correction that can be performed by the image processing. Therefore, the image signal includes aberrations for only the objects outside the above-described range.

When the image processing is performed such that aberrations do not occur in a predetermined small area, blurred portions can be obtained in an area outside the predetermined small area.

As described above, according to the present embodiment, the image pickup apparatus 100 includes the element-including optical system 110 and the detector 120 for forming a first image. In addition, the image pickup apparatus 100 also includes the image processing device 140 for forming a final high-definition image from the first image. The positions where the element-including optical system 110 and the detector 120 are attached are adjusted such that a contrast detected after stopping down the aperture in the optical system including the optical wavefront modulation element for modulating the optical transfer function (OTF) becomes equal to or more than a predetermined threshold. Therefore, the element-including optical system and the detector are attached at suitable positions and the depth of field can be increased.

In addition, the optical system can be simplified and the costs can be reduced. Furthermore, a high-quality reconstruction image in which the influence of noise is small can be obtained.

In addition, the kernel size and the coefficient used in the convolution operation are variable, and suitable kernel size and coefficient can be determined on the basis of the inputs from the operating unit 180. Accordingly, it is not necessary to take the magnification and defocus area into account in the lens design and the reconstructed image can be obtained by the convolution operation with high accuracy.

In addition, a natural image in which the object to be shot is in focus and the background is blurred can be obtained without using a complex, expensive, large optical lens or driving the lens.

The image pickup apparatus 100 according to the present embodiment may be applied to a small, light, inexpensive DEOS for use in consumer appliances such as digital cameras and camcorders.

In addition, in the present embodiment, the image pickup apparatus 100 includes the element-including optical system 110 and the image processing device 140. The element-including optical system 110 includes the optical wavefront modulation element for changing the wavefront shape of light that passes through the imaging lens 112 to form an image on the light-receiving surface of the detector 120. The image processing device 140 receives a first image FIM from the detector 120 and subjects the first image to a predetermined correction process for lifting the MTF relative to the special frequency so as to obtain a final high-definition image FNLIM. Thus, there is an advantage in that a high-definition image can be obtained.

In the present embodiment, the element-including optical system 110 and the image processing device 140 are provided. The element-including optical system 110 includes the optical wavefront modulation element 113a for changing the wavefront shape of light that passes through the imaging lens 112 to form an image on the light-receiving surface of the detector 120. The image processing device 140 receives a first image FIM from the detector 120 and subjects the first image to a predetermined correction process for lifting the MTF relative to the special frequency so as to obtain a final high-definition image FNLIM. Thus, the image pickup apparatus according to the present embodiment has an advantage in that a high-definition image can be obtained.

In addition, the structure of the optical system 110 can be simplified and the optical system 110 can be easily manufactured. In addition, the costs can be reduced.

In the case in which a CCD or a CMOS sensor is used as the detector, the resolution has a limit determined by the pixel pitch. If the resolution of the optical system is equal to or more than the limit, phenomenon like aliasing occurs and adversely affects the final image, as is well known.

Although the contrast is preferably set as high as possible to improve the image quality, a high-performance lens system is required to increase the contrast.

In the known image pickup apparatus, to avoid the occurrence of aliasing, a low-pass filter composed of a uniaxial crystal system is additionally used.

Although the use of the low-pass filter is basically correct, since the low-pass filter is made of crystal, the low-pass filter is expensive and is difficult to manage. In addition, when the low-pass filter is used, the structure of the optical system becomes more complex.

As described above, although images with higher definitions are demanded, the complexity of the optical system must be increased to form high-definition images in the known image pickup apparatus. When the optical system becomes complex, the manufacturing process becomes difficult. In addition, when an expensive low-pass filter is used, the costs are increased.

In comparison, according to the present embodiment, aliasing can be avoided and high-definition images can be obtained without using the low-pass filter.

In the element-including optical system according to the present embodiment, the optical wavefront modulation element is positioned closer to the object-side lens than the aperture. However, the optical wavefront modulation element may also be disposed at the same position as the aperture or at a position closer to the imaging lens than the aperture. Also in such a case, effects similar to those described above can be obtained.

What is claimed is:

1. An image pickup apparatus comprising: an element-including optical system including an optical system and an optical wavefront modulation element that modulates an optical transfer function; a variable aperture; a detector attached at a position where the relative positions of said detector and said element-including optical system are determined by adjusting said variable aperture, said detector picking up an object image that passes through said optical system, said variable aperture, and said optical wavefront modulation element; and a converter for generating an image signal with a smaller blur than that of a signal of a blurred object image output from said detector, wherein when an optical axis of said optical system is z axis and tow axes perpendicular to each other are x and y axes, a phase of said optical wavefront modulation element is expressed as follows: z=exp{i times SUM j=1 $C_j x^m y^n$)} where m and n are integers and j= [$(m+n)^2+m+3n$]/2, absolute value of x is less then or equal then 1, absolute value of is less then or equal then 1 are satisfied.

2. The image pickup apparatus according to claim 1, wherein said optical wavefront modulation element is capable of adjusting a focal position of an optical system that has a function of making a change in the optical transfer function in accordance with a distance to an object smaller than that of said optical system.

3. The image pickup apparatus according to claim 1, wherein the optical transfer function of said element-including optical system is 0.1 or more for a frequency equal to or less than the Nyquist frequency of said detector over an object distance range larger than the depth of field of said optical system.

4. The image pickup apparatus according to claim 1, further comprising:
a signal processor including noise-reduction filter and performing a predetermined operation of the image signal.

5. The image pickup apparatus according to claim 4, further comprising:
memory for storing a coefficient used by said signal processor for performing a noise reducing process in accordance with exposure information.

6. The image pickup apparatus according to claim 5, wherein the exposure information includes aperture information.

7. The image pickup apparatus according to claim 4, further comprising:
memory for storing a coefficient used by said signal processor and a coefficient used for performing an optical-transfer-function reconstruction process in accordance with exposure information.

8. The image pickup apparatus according to claim 7, wherein the exposure information includes aperture information.

9. The image pickup apparatus according to claim 1, further comprising:
an object-distance-information generator for generating information corresponding to a distance to an object, wherein said converter generates the image signal on the basis of the information generated by said object-distance-information generator.

10. The image pickup apparatus according to claim 9, further comprising:
conversion-coefficient storage for storing at least two coefficients corresponding to blur caused by at least said optical wavefront modulation element or said optical system in association with the distance to the object; and
a coefficient-selector for selecting a coefficient that corresponds to the distance to the object from the coefficients in said conversion-coefficient storage on the basis of the information generated by said object-distance-information generator,
wherein said converter generates the image signal on the basis of the coefficient selected by said coefficient-selector.

11. The image pickup apparatus according to claim 9, further comprising:
a conversion-coefficient calculator for calculating a coefficient on the basis of the information generated by said object-distance-information generator,
wherein said converter generates the image signal on the basis of the coefficient obtained by said conversion-coefficient calculator.

12. The image pickup apparatus according to claim 1, wherein said optical system includes a zoom optical system and the image pickup apparatus further comprises:
correction-value storage for storing one or more correction values in association with a zoom position or an amount of zoom of said zoom optical system;
second conversion-coefficient storage for storing a coefficient corresponding to blur caused by at least said optical wavefront modulation element or said optical system; and
a correction-value selector for selecting a correction value that corresponds to the distance to the object from the correction values in said correction-value storage on the basis of the information generated by said object-distance-information generator,
wherein said converter generates the image signal on the basis of the coefficient obtained by said second conversion-coefficient storage and the correction value selected by said correction-value selector.

13. The image pickup apparatus according to claim 12, wherein each of the correction values includes a kernel size of the blurred object image.

14. The image pickup apparatus according to claim 1, further comprising:
an object-distance-information generator for generating information corresponding to a distance to an object; and
a conversion-coefficient calculator for calculating a coefficient on the basis of the information generated by said object-distance-information generator,
wherein said converter generates the image signal on the basis of the coefficient.

15. The image pickup apparatus according to claim 14, wherein said conversion-coefficient calculator uses a kernel size of the blurred object image as a parameter.

16. The image pickup apparatus according to claim 14, further comprising:
storage,
wherein said conversion-coefficient calculator stores the coefficient in said storage, and
wherein said converter generates the image signal on the basis of the coefficient stored in said storage.

17. The image pickup apparatus according to claim 16, wherein said converter performs a convolution operation on the basis of the coefficient.

18. A manufacturing apparatus for manufacturing an image pickup apparatus including an element-including optical system and a detector, said element-including optical system including an optical system and an optical wavefront modulation element for modulating an optical transfer function, the manufacturing apparatus comprising: an adjusting device for adjusting positions where said element-including optical system and said detector are attached by adjusting an aperture included in said element-including optical system, wherein when an optical axis of said optical system is z axis and tow axes perpendicular to each other are x and y axes, a phase of said optical wavefront modulation element is expressed as follows: $z=\exp\{i \text{ times SUM } j=1 \text{ } C_j x^m y^n)\}$ where m and n are integers and $j=[(m+n)^2+m+3n]/2$, absolute value of x is less then or equal then 1, absolute value of y is less then or equal then 1 are satisfied.

19. The manufacturing apparatus according to claim 18, further comprising:
   a drive system for driving said element-including optical system along an optical axis;
   a detector for detecting a contrast in association with the position of said element-including optical system driven by said driving system; and
   a controller for determining the position at which the contrast detected by said detector is equal to or more than a predetermined threshold as the position of said element-including optical system.

20. The manufacturing apparatus according to claim 18, wherein said optical wavefront modulation element is capable of adjusting a focal position of an optical system that has a function of making a change in the optical transfer function in accordance with a distance to an object smaller than that of an optical system free from said optical wavefront modulation element.

21. A method for manufacturing an image pickup apparatus by adjusting positions where an element-including optical system and a detector are attached, the method comprising the steps of: forming said element-including optical system by placing an optical wavefront modulation element that modulates an optical transfer function in an optical system; and adjusting positions where said element-including optical system and said detector are attached by adjusting an aperture included in said element-including optical system, the prior art of record fails to teach or fairly suggest the combination of all the limitations of claim 19 that includes, wherein when an optical axis of said optical system is z axis and tow axes perpendicular to each other are x and y axes, a phase of said optical wavefront modulation element is expressed as follows: $z=\exp\{i \text{ times SUM } j=1 \text{ } C_j x^m y^n)\}$ where m and n are integers and $j=[(m+n)^2+m+3n]/2$, absolute value of x is less then or equal then 1, absolute value of y is less then or equal then 1 are satisfied.

22. The method according to claim 21, further comprising the steps of:
   driving said element-including optical system along an optical axis;
   detecting a contrast in association with the position of said element-including optical system; and
   determining the position at which the detected contrast detected is equal to or more than a predetermined threshold as the position of said element-including optical system.

23. The method according to claim 21, further comprising the step of:
   adjusting the position of said optical wavefront modulation element so as to adjust a focal position of an optical system such that a function is obtained in which a change in the optical transfer function in accordance with a distance to an object is made smaller than that of an optical system free from said optical wavefront modulation element.

* * * * *